US012752753B2

(12) United States Patent
Leiber

(10) Patent No.: US 12,752,753 B2
(45) Date of Patent: Oct. 6, 2026

(54) DRIVING DYNAMICS SYSTEM, ELECTRIC VEHICLE WITH CENTRAL CONTROL

(71) Applicant: IPGATE AG, Pfaffikon (CH)

(72) Inventor: Thomas Leiber, Rogoznica (HR)

(73) Assignee: IPGATE AG, Pfaffikon (CH)

( * ) Notice: Subject to any disclaimer, the term of this patent is extended or adjusted under 35 U.S.C. 154(b) by 0 days.

(21) Appl. No.: 19/306,019

(22) Filed: Aug. 21, 2025

(65) Prior Publication Data

US 2026/0001516 A1 Jan. 1, 2026

Related U.S. Application Data

(63) Continuation of application No. 17/923,909, filed as application No. PCT/EP2021/052977 on Feb. 8, 2021, now Pat. No. 12,479,404.

(30) Foreign Application Priority Data

Feb. 12, 2020 (DE) ..................... 10 2020 103 660.4

(51) Int. Cl.
*B60T 8/1755* (2006.01)
*B60L 15/20* (2006.01)
(Continued)

(52) U.S. Cl.
CPC ............ *B60T 8/1755* (2013.01); *B60L 15/20* (2013.01); *B60L 15/2009* (2013.01);
(Continued)

(58) Field of Classification Search
CPC ...... B60T 8/1755; B60T 13/686; B60T 17/22; B60T 2250/03; B60T 2270/10;
(Continued)

(56) References Cited

U.S. PATENT DOCUMENTS 6,015,193 A 1/2000 Vogel et al.
10,501,111 B2 12/2019 Engels et al.
(Continued)

FOREIGN PATENT DOCUMENTS

DE 102009004636 A1 7/2010
DE 102013224313 A1 9/2014
(Continued)

OTHER PUBLICATIONS

Office Action issued Nov. 2, 2020 in DE Application No. 102020103660.4.
(Continued)

*Primary Examiner* — Yi-Kai Wang
(74) *Attorney, Agent, or Firm* — Naschitz, Brandes, Amir & Co.; Jeffrey W. Gluck

(57) ABSTRACT

A driving dynamics system for a vehicle may include a primary control unit for detecting and/or generating steering commands and braking commands; a brake system having first and second electrohydraulic pressure supply units; four hydraulically actuatable wheel brakes of respective wheels; electrically actuatable brake pressure adjustment valves; and an electric steering actuator for actuating at least one axle. The driving dynamics system may implement a steering command during normal operation to actuate at least one of the pressure supply units and the steering actuator and/or, to implement a braking command during normal operation, to actuate at least the second pressure supply unit and at least the brake pressure adjustment valves for a wheel-specific pressure adjustment and, in a fault case, to actuate at least the first pressure supply unit and at least the brake pressure adjustment valves for a wheel-specific pressure adjustment.

20 Claims, 14 Drawing Sheets

(51) Int. Cl.

| | |
|---|---|
| ***B60T 13/68*** | (2006.01) |
| ***B60T 17/22*** | (2006.01) |
| ***B60W 10/188*** | (2012.01) |
| ***B60W 10/20*** | (2006.01) |
| ***B60W 50/02*** | (2012.01) |
| *B62D 5/04* | (2006.01) |

(52) U.S. Cl.
CPC ............ *B60T 13/686* (2013.01); *B60T 17/22* (2013.01); *B60W 10/188* (2013.01); *B60W 10/20* (2013.01); *B60W 50/02* (2013.01); *B60T 2250/03* (2013.01); *B60T 2270/10* (2013.01); *B60T 2270/30* (2013.01); *B62D 5/0487* (2013.01)

(58) Field of Classification Search
CPC ...... B60T 2270/30; B60T 7/042; B60T 8/885; B60T 13/662; B60T 2260/02; B60T 2260/09; B60T 2270/402; B60T 2270/404; B60T 2270/413; B60T 2270/82; B60T 17/221; B60T 13/745; B60L 15/20; B60L 15/2009; B60W 10/188; B60W 10/20; B60W 50/02; B62D 5/0487
USPC ............................................................ 701/48
See application file for complete search history.

(56) References Cited

U.S. PATENT DOCUMENTS

| | | | | |
|---|---|---|---|---|
| 10,988,124 | B2 | 4/2021 | Besier et al. | |
| 11,014,545 | B2 | 5/2021 | Plewnia et al. | |
| 11,332,112 | B2 | 5/2022 | Zimmermann et al. | |
| 2008/0294319 | A1* | 11/2008 | Baijens | B60T 8/24 701/70 |
| 2015/0375726 | A1 | 12/2015 | Roll et al. | |
| 2017/0232971 | A1* | 8/2017 | Karlsson | B60W 30/19 701/54 |
| 2018/0194337 | A1* | 7/2018 | Leiber | B60T 13/58 |
| 2018/0229702 | A1* | 8/2018 | Son | B60T 8/4086 |
| 2019/0039579 | A1* | 2/2019 | Ohkubo | B60L 7/26 |
| 2020/0362888 | A1 | 11/2020 | Leiber et al. | |
| 2021/0016785 | A1* | 1/2021 | Nakagawa | B60T 17/18 |

FOREIGN PATENT DOCUMENTS

| | | | |
|---|---|---|---|
| DE | 102014200071 | A1 | 9/2014 |
| DE | 112009005541 | B3 | 8/2017 |
| DE | 102016203563 | A1 | 9/2017 |
| DE | 102016211982 | A1 | 1/2018 |
| DE | 102017000472 | A1 | 7/2018 |
| DE | 102017222445 | A1 | 7/2018 |
| DE | 102017222450 | A1 | 7/2018 |
| DE | 102005055751 | B4 | 9/2018 |
| DE | 102005018649 | B4 | 10/2018 |
| DE | 102017213505 | A1 | 2/2019 |
| DE | 102017125696 | A1 | 5/2019 |
| DE | 112019001312 | T5 | 12/2020 |
| EP | 0754611 | A1 | 1/1997 |
| EP | 2225133 | B1 | 9/2010 |
| WO | 2006111392 | A1 | 10/2006 |
| WO | 2009083216 | A2 | 7/2009 |
| WO | 2010069688 | A1 | 6/2010 |
| WO | 2011098178 | A1 | 8/2011 |
| WO | 2012143311 | A1 | 10/2012 |
| WO | 2017/198549 | A1 | 11/2017 |
| WO | 2018130481 | A1 | 7/2018 |
| WO | 2019058204 | A1 | 3/2019 |
| WO | 2019/176301 | A1 | 9/2019 |

OTHER PUBLICATIONS

Int'l Search Report and Written Opinion issued May 14, 2021 in Int'l Application No. PCT/EP2021/052977.
Office Action issued Mar. 5, 2025 in U.S. Appl. No. 17/923,909.

* cited by examiner

DRIVING DYNAMICS SYSTEM, ELECTRIC VEHICLE WITH CENTRAL CONTROL

CROSS-REFERENCE TO RELATED APPLICATION

This application is a continuation of U.S. patent application Ser. No. 17/923,909, filed on Nov. 7, 2022 as a Section 371 of International Application No. PCT/EP2021/052977, filed Feb. 8, 2021, which was published in the German language on Aug. 19, 2021 under International Publication No. WO 2021/160567 A1, which claims priority under 35 U.S.C. § 119 (b) to German Patent Application No. 10 2020 103 660.4, filed Feb. 12, 2020, the disclosures of which are incorporated herein by reference.

FIELD OF ENDEAVOR

The present invention relates to a driving dynamics system (DDS), to a vehicle having a corresponding driving dynamics system and to a method for controlling a vehicle. The driving dynamics system and the control method are preferably designed for electric vehicles or hybrid vehicles with highly automated driving (HAD), fully automated driving (FAD) or autonomous driving (AD).

BACKGROUND

The automotive industry is in a disruptive process of change. In addition to the increasing market penetration of electric vehicles, various levels of automated driving are being run through; in the first instance, these are: Level 3—Highly Automated Driving—HAD, Level 4—Fully Automated Driving—FAD and Level 5—Autonomous Driving—AD, wherein each level increases the demands on the systems used to control the driving dynamics, in particular using the steering system and the brakes.

Electric vehicles or vehicles having a relatively powerful on-board power system have driven the development of electric and electrohydraulic brake systems. The replacement of vacuum brake force boosters with electric brake force boosters (e-BKV) began in 2005 after initial solutions (cf. WO2006111392A1) with the market launch of what are known as 2-box solutions with electric secondary brake force boosters according to WO2010069688A1 and DE102009004636B4 and an additional ESP unit in 2013, followed promptly by integrated 1-box systems with a pedal simulator DE102013224313A1. Solutions for Level 3 (HAD) are currently being developed.

Starting from Level 3 (HAD), a brake-by-wire brake system and steer-by-wire steering system are required. In addition, the core functions of the brakes (ABS) and the steering system (steerability, yaw moment interventions for vehicle stability) have to be designed to be redundant for the first time, since, in autonomous driving mode, the driver is not sufficient to provide the redundancy function by actuating a master brake cylinder. In addition to AD, electric vehicles favor what are known as brake-by-wire brake systems with pedal sensation simulators, since the potential for energy recovery when braking via powerful electric drive motors is able to be fully exploited only with a decoupled brake system. In this case, electric secondary boosters reach their limits, since, in such a system, strong recuperation influences the pedal sensation and additionally brings about a residual friction torque on the brake and thus has an impact on the driving resistance and thus the range of electric vehicles. Furthermore, the secondary brake force booster has critical defects and is heavily dependent on influencing factors, as explained in ATZ article 3/19 “Bremskraftverstärker für das automatisierte Fahren” [Brake force booster for automated driving].

Furthermore, starting from Level 3, it is also necessary to provide redundancy of the ABS function for the first time. In what are known as 2-box systems with an electric secondary booster and ESP/ABS unit as described in DE112009005541B3, this is implemented in that the electric brake force booster (e-BKV) takes over a pressure modulation function in the event of failure of the ESP unit, in order always to ensure a high level of vehicle deceleration. Therefore, the automated intermittent brake (also referred to as rudimentary ABS in specialist literature) has already been implemented in the system according to WO2011/098178 in accordance with various publications by the applicant. The automated intermittent brake leads to sufficient braking distances (approx. 200% of the braking distance with ABS compared to a full-fledged wheel-specific ABS) and acceptable stability by maintaining steerability. However, if the pedal is actuated by the driver during this emergency function, this may lead to the wheels locking, since the actuation via the brake pedal acts directly on the piston of the master brake cylinder, which is moved back and forth in the intermittent brake function according to DE112009005541B3 and may be under the influence of a brake pedal.

In steering systems, redundancy is likewise required for autonomous driving starting from Level 3; steer-by-wire is implemented. U.S. Pat. No. 10,501,111 and WO 2017/198549 for example provide multiple electric actuators for steering two wheels of a vehicle axle, wherein, in the event of failure of one actuator, the second actuator takes over the steering function and the steering torque is transferred to the other actuator. For example, in WO 2017/198549, force is thus transferred from the first actuator to the second actuator via a shiftable clutch.

Starting from Level 4 (FAD), 3-fold redundancies are expected for adequate system availability, for example in the case of the pedal sensors with the rule “2 out of 3”. Furthermore, a pedal simulator is essential owing to the increasing recuperation performance of electric vehicles and the lack of acceptance of changes in the pedal characteristic, because fully automatic driving (FAD) operation may be implemented over a longer period of time and the driver is not prepared for a change in the pedal characteristic in the event of switching to piloted driving. A redundant ABS function with brake circuit-specific or wheel-specific control is also required. The demands on vehicle stability, steerability and short braking distances even in the event of partial failure are also increasing, for example short braking distances must be achieved at the same time even in the case of a non-homogeneous road and different coefficients of friction for the vehicle wheels (for example u-split) and it must be ensured that the vehicle is still steerable and that cornering is not lost, that is to say the vehicle starts to skid. The redundancy of yaw moment interventions in brake systems is therefore becoming increasingly important. Redundancy in brake systems and steering systems therefore also plays a major role.

In Level 5 (AD), the steering wheel, brake and accelerator pedal may be completely eliminated and the vehicle is controlled exclusively via a central computer. Since the driver is no longer able to intervene using a brake pedal or using a steering wheel in the event of systems failing, a fail-safe 2-way redundancy or 3-way redundancy of all core functions of the brake (brake force booster, ABS) and steering system is required.

Vehicle manufacturers are working on fully self-driving vehicles without a driver, which, in the first stage of development, will have a brake pedal with a pedal sensation simulator (Level 4 FAD) and, in the last stage of development (Level 5 AD), will no longer have a brake pedal and an accelerator pedal. In addition, the domain structure is introduced with controllers/domains for autonomous and piloted driving mode. It thus becomes necessary for the domains or controllers to be able to access the steering system and brake both in autonomous and in piloted driving. In addition, vehicles having powerful electric drive motors on both the rear axle and the front axle are becoming increasingly popular. The possibility of recovering energy with the electric motors in generator mode should therefore expediently be exploited to the maximum. In addition, a friction-free brake should be implemented in order to maximize the range of electric vehicles.

As an alternative to electrohydraulic brake systems, there is the electromechanical brake (EMB, electromechanical wedge brake) as a well-known solution. The EMB has not become established in the past due to safety concerns and high costs. For reasons of cost and reliability, brake systems for the Levels FAD and AD cannot just have EMB, since redundancy for a redundant wheel-specific braking torque intervention is very difficult to implement. An EMB is therefore suitable only for the rear axle of a vehicle, because the rear axle contributes less to the brake force, and a failure is not considered to be as critical as on the front axle.

DE102005055751B4 and DE102005018649B4 explain high-precision piston pressure control (PPC) using an electrically driven piston-cylinder unit with a spindle drive for the first time. A piston-cylinder unit driven by an electric motor with a sensor system for measuring the piston position and motor current enables pressure control, respectively braking torque control on the hydraulic wheel brakes, which is entirely comparable to an electromechanical brake in terms of precision and has therefore become established as the basis for future brake systems.

A holistic optimization of driving dynamics control using synergies of steering system, brake and electric motors has not yet been sufficiently considered in the prior art, since brake-by-wire brakes and a steer-by-wire steering system have been considered as separate disciplines. In addition, there are only complex brake systems according to the prior art (WO2012143311A1, WO 2018/130481, DE102016211982) that meet the redundancy requirements for HAD, but these are not yet suitable for FAD/AD. The core deficit of the systems is by principle the lack of redundancy of the wheel-specific pressure control for a fully redundant 4-channel ABS function and the possibility of generating yaw moments in a targeted manner. In addition, the possibilities for controlling the 2nd pressure supply in the event of failure of the pump is not utilized.

SUMMARY OF THE DISCLOSURE

The object of the present invention is to specify an improved driving dynamics system, a vehicle having a corresponding driving dynamics system and a method for controlling a vehicle.

Furthermore, the intention is to provide an architecture for an electric or hybrid vehicle, for example having a range extender electric motor, which is suitable for the demands of high availability in fully automated driving (FAD) and in autonomous driving (AD). In particular, the driving dynamics system is intended to be implemented with minimal effort.

The object of the invention may be achieved by a driving dynamics system, vehicle, and/or method as recited in the claims.

The object is achieved in particular by a driving dynamics system for a vehicle, comprising:

- a primary control unit for detecting and/or generating steering commands and braking commands;
- a brake system having a first electrohydraulic pressure supply device and a second electrohydraulic pressure supply device;
- four hydraulically actuatable wheel brakes that are assigned to wheels;
- electrically actuatable brake pressure adjustment valves,
- an, in particular electric, steering actuator for actuating at least one axle, wherein the driving dynamics system is designed, in order to implement at least one steering command, in particular during normal operation, to actuate at least one of the pressure supply devices and the steering actuator and/or, in order to implement a braking command during normal operation, to actuate at least the second pressure supply device and at least the brake pressure adjustment valves for a wheel-specific pressure adjustment and, in a (first) fault case, to actuate at least the first pressure supply device and at least the brake pressure adjustment valves for a wheel-specific pressure adjustment.

One aspect of the invention is that the function of the electronic steering actuator is supported by at least one pressure supply device, in particular of a brake module. This means that, using the pressure supply device, a yaw moment intervention takes place, which improves the steering behavior of the vehicle and thus leads to a more efficient and more reliable implementation of the steering commands. In addition or as an alternative, one aspect of the present invention is that braking commands that are implemented (solely) by the first pressure supply device during normal operation are implemented with the aid of the second pressure supply device in a fault case. In this case, pressure is preferably adjusted in a wheel-specific manner, this being able to be performed for example with the aid of the brake pressure adjustment valves. In the fault case, the pressure may thus be provided by the first pressure supply device, wherein the wheel-specific pressure adjustment is ensured by the brake pressure adjustment valves.

In one embodiment, a steering command specifies a direction and/or a change of direction. A braking command may be defined such that it indicates the basic desire to brake. As an alternative, brake pressure values or other values that indicate a desired degree of deceleration of the vehicle, including the ABS control function for maximum deceleration in inhomogeneous driving conditions (for example u-split, u-jump) while at the same time maintaining the steerability and ESP yaw moment interventions for stabilizing a vehicle, in particular in driving situations where the vehicle loses its lateral guidance, are understood to be a braking command.

The pressure supply devices may be parts of brake modules. In one embodiment, the first pressure supply device is part of the first brake module and the second pressure supply device is part of the second brake module. The respective brake modules may be arranged in separate housings or in a common housing or component.

In one embodiment, the first brake module comprises a first brake module controller, in particular for controlling the first pressure supply device, and the second brake module comprises a second brake module controller for controlling the second pressure supply device. According to the invention, provision may also be made for another superordinate controller that coordinates the activities of the first brake module controller and/or the second brake module controller.

Furthermore, some or all of said controllers for controlling the first and/or second pressure supply device may be combined in a computing unit, which preferably enables redundant and/or fail-safe operation.

The steering actuator is designed to actuate at least one axle, preferably a front axle. The respective axle may have two wheels, which are then steered in a specific direction by way of the steering actuator.

One advantage of the invention is that of providing an efficient driving dynamics system in which fault cases are compensated for or addressed by redundant hardware and/or software.

In one embodiment, the driving dynamics system comprises at least one detection unit for detecting at least one fault case. The fault case may be the first fault case already mentioned. The detection unit may be a software module or dedicated hardware. In one embodiment, the detection unit is implemented as part of the controllers already described. The detection unit may be designed to detect an at least partial failure of the second brake module, in particular of the second pressure supply device, and/or of the steering actuator. The driving dynamics system is preferably designed to ensure measures for providing a torque intervention and/or steering assistance by way of the first pressure supply device in said first fault case. In this case, using the first pressure supply device, a pressure may be built up in at least one wheel brake and a wheel-specific braking torque, in particular yaw moment, may thus be generated. The driving dynamics system according to the invention may therefore provide torque interventions and/or steering assistance even in the event of failure of the second brake module, which may be responsible for wheel-specific brake pressure control.

The detection unit may, in addition or as an alternative, be designed to detect a second fault case. The second fault case may be an at least partial failure of the steering actuator. In this fault case, a steering command may be implemented using the second pressure supply device, in particular by building up a pressure in a selection of wheel brakes. In one embodiment, wheel brakes are activated on one side of the vehicle. Thus, even in the event of complete failure of the steering actuator, the second pressure supply device may still be used to steer, at least at low speeds.

The first brake module having the first pressure supply device may be configured to apply a pressure medium to at least one first brake circuit via a first connection point and at least one second brake circuit via a second connection point. The first brake module may thus be designed to build up pressure in a brake circuit-specific manner.

In the embodiment, a first isolation valve of the first brake module may be arranged in a hydraulic line between the first pressure supply device of the first brake module and the first connection point, and a second isolation valve may be arranged in a second hydraulic line between the first pressure supply device and the second connection point. The isolation valves thus make it possible to provide different pressures at the individual connection points within the first brake module, possibly even in fault cases. In this connection, the brake system may be designed to detect a third fault case, in particular a total failure of the second brake module having the second pressure supply device, and, in this third fault case, to control the first pressure supply device and the second isolation valve in order to implement at least one brake circuit-specific pressure control operation in the at least two brake circuits. Thus, even in a situation in which wheel-specific adjustment of pressures is no longer ensured, an efficient braking intervention may be ensured depending on the brake circuit distribution. A 2-channel ABS may for example be implemented in this constellation.

In one (other) embodiment, the pressure supply units may be connected to the brake circuits not in series but essentially in parallel with one another. In one embodiment, the second pressure supply unit is thus connected to a first brake circuit via at least one first hydraulic line and the first pressure supply unit is connected to a second brake circuit via at least one second hydraulic line. In this constellation, provision may be made for an isolation valve that hydraulically connects the first and the second hydraulic line and may potentially be used for hydraulic decoupling or disconnection. Using this isolation valve and said arrangement, it is possible to hydraulically decouple failed brake circuits and/or wheel brakes such that effective braking is able to be ensured with the remaining wheel brakes or with the remaining brake circuit. This makes it possible to further increase safety.

In said embodiment, the first and the second hydraulic line may be hydraulically connected to one another via at least one first and at least one second isolation valve. In this constellation too, the isolation valves may be closed in order to at least partially disconnect the connection. A (central) outlet valve for the pressure reduction may be provided in a hydraulic line section between the first and the second isolation valve. This central outlet valve is preferably connected to a reservoir via a fluid connection. The two isolation valves, in conjunction with the outlet valve, make it possible to reduce the pressure in a brake circuit-specific manner. Furthermore, even in the event of failure of one of the two brake circuits, pressure may be reduced in a controlled manner in the respective other brake circuit and, if necessary, built up again using the pressure supply units. ABS functions and/or yaw moment interventions may thus be implemented even in the event of a partial failure.

As an alternative or in addition, a (wheel-specific or brake circuit-selective) pressure reduction may be implemented via one of the pressure supply units. This makes it possible to quantify the pressure reduction, for example by ascertaining the piston stroke. If necessary, the provision or use of pressure sensors may be dispensed with.

The embodiment described above, but also the other embodiments, may comprise bidirectional brake pressure adjustment valves for a pressure build-up and a pressure reduction. Each wheel brake is preferably assigned (exactly) one brake pressure adjustment valve in order to build up and reduce pressure in the respective wheel brake.

Using bidirectional valves makes it possible to reduce the number of valves needed, while at the same time creating a simpler and fail-safe system. By way of example, when there is pressure in a hydraulic line to the wheel brake, individual wheel brakes may thus for example be shut off by closing the bidirectional inlet valves and the pressure control mode may still be maintained in the remaining 3 wheel brakes.

The use of a single-circuit pump as second pressure supply device may be advantageous, in particular in connection with the parallel connection of the pressure supply devices. This may be hydraulically connected to the reservoir in order to convey pressure medium to the first and/or second brake circuit.

The detection device may be designed to detect a fourth fault case, in particular the failure of a brake circuit, and/or a fifth fault case, in particular the failure of a wheel brake. The driving dynamics system may be designed to close at least one of the isolation valves and/or at least one of the brake pressure adjustment valves in response to the detection of the fourth and/or the fifth fault case in order to hydraulically decouple or disconnect the failed brake circuit and/or the failed wheel brake. The driving dynamics system is thus preferably suitable, in the form already outlined, for hydraulically disconnecting a brake circuit and/or a selection of wheel brakes such that a defect in the corresponding areas has no influence on the rest of the system.

In one embodiment, electromotive drives in the driving dynamics system are designed such that they are still able to be operated even in the event of failure of some windings (for example a motor having two three-phase branches and failure of one three-phase branch, operation with only one three-phase branch). In this regard, the steering actuator, the first pressure supply device and/or the second pressure supply device are available. The steering actuator may thus comprise at least one electromotive drive with redundant windings and redundant control, such that, in the event of failure, the functionality of the steering actuator may be maintained at least partially by way of the redundant windings and/or control. The winding may be a redundant 3-phase winding.

Accordingly, the first and/or second pressure supply device may each comprise at least one electromotive drive with redundant windings and redundant control, such that, in the event of failure, a pressure reduction and/or pressure build-up in the wheel brakes or brake circuits is able to be implemented at least partially by way of the redundant windings and control. This form of redundancy further increases the safety of the driving dynamics system.

The driving dynamics system may be designed to apply pressure to the wheel brakes for standstill braking by way of the first pressure supply device and/or second pressure supply device and/or to actuate at least one vehicle electric motor for standstill braking. In conventional systems, additional components are often used to implement appropriate standstill braking, for example by way of a electromechanical parking brake (EPB). The present invention proposes to implement standstill braking hydraulically and/or via the at least one vehicle electric motor, which is usually intended to drive the vehicle. It is thus possible to dispense with further components for providing standstill braking, in particular the EPB. In one embodiment, the first pressure supply device and/or the second pressure supply device and/or the at least one vehicle electric motor cooperate in order to provide corresponding standstill braking.

In one embodiment, a sixth fault case may be detected. This sixth fault case may be an at least partial failure of the first pressure supply device or of the second pressure supply device, wherein the driving dynamics system is designed to activate the respective other pressure supply device and/or at least one of the vehicle electric motors in order to implement standstill braking. In this respect, the driving dynamics system according to the invention also provides redundancies with regard to standstill braking that ensure reliable functioning in the event of a failure. The sixth fault case may in turn be detected by way of the detection device.

After a corresponding pressure has been built up in the wheel brakes by way of the first and/or second pressure supply device, the pressure may be maintained via valves, for example via the brake pressure adjustment valves. In this state, it is not necessary to energize the pressure supply device, meaning that energy may be saved.

The standstill brake may be used normally on all 4 wheel brakes without any faults. When the standstill brake is actuated, either an axle is held by an electric motor via torque generation or pressures are built up on multiple wheel brakes via the pressure supply and the pressure in the wheel brakes is preferably maintained by closing bidirectionally active wheel pressure control valves (SV) and regularly diagnosed with the pressure supply. If for example the hydraulic line to a wheel brake fails, for example due to a line break in the hydraulic line, the consumer may be disconnected by closing the wheel pressure control valve and pressure may still be generated in the remaining wheel brakes. Even in the event of failure of two hydraulic lines to the wheel brake, a standstill function is thus still possible as with a conventional EPB, which acts only on two wheels of an axle, that is to say even in the event of failure of two hydraulic lines, the same standstill function as with an EPB may be achieved. This redundancy makes it possible to dispense with the mechanical parking brake or EPB if appropriate solutions are provided for the unlikely complete failure of an energy source, for example a small backup battery for the complete on-board power system failure.

If an at least partial failure of the second pressure supply unit is detected (cf. for example the first fault case), the driving dynamics system may, as already explained, be configured to provide an ABS function and/or a yaw moment intervention, wherein (wheel-specific and/or selective) adjustment of the pressures in the wheel brakes or actuation of at least one of the brake pressure adjustment valves of the second brake module and/or of an isolation valve of the second brake module and the first pressure supply unit take place. As already explained, in this fault case, the pressure may be generated by the first pressure supply unit, wherein at least some of the valves from the second brake module are used in order to adjust the pressures in a wheel-specific or selective manner.

Very simple measures, for example the provision of a corresponding interface for accessing the respective actuators, thus significantly increase safety.

There may be communication connections, in particular bus connections, between the controllers, in particular the brake modules, wherein the first controller is preferably designed to receive measured pressure values from the second pressure supply unit and/or wheel speed signals via the communication connection.

The driving dynamics system may comprise at least one (wired) bus connection for the communication connection of the first brake module, in particular a controller of the first brake module, and/or the steering actuator, in particular a controller of the steering actuator, to the primary control unit. The bus connection may be designed to be redundant, such that a redundant connection is available in the event of failure of one of the connections. The redundancy may be hot or cold redundancy.

In addition or as an alternative, provision may be made for transceiver units for the wireless communication connection of the first brake module, in particular the controller of the first brake module, and/or the steering actuator, in particular the controller of the steering actuator, to the primary control unit. Using wireless communication connections has many advantages since it greatly simplifies the manufacture of the system. Wireless communication connections may be advantageous in particular for creating the required redundancies.

The object mentioned at the outset may furthermore be achieved by a vehicle comprising one of the driving dynamics systems as have already been explained above. This results in advantages similar to those described in connection with the individual driving dynamics systems.

The vehicle may comprise:

a front axle;

a rear axle, wherein wheels on the front axle and/or on the rear axle are able to be braked via the wheel brake.

In one embodiment, provision is made for at least one vehicle electric motor for driving the front axle and/or the rear axle, wherein the primary control unit is connected wirelessly and/or in wired form to the vehicle electric motor in terms of communication in order to actuate it at least so as to generate a braking torque. In addition, measured signals may be received from the vehicle electric motor in order to adjust the behavior of the brake modules to the vehicle electric motor. In one embodiment, a vehicle electric motor is arranged on the rear or front axle. However, it is also possible to consider embodiments in which multiple vehicle electric motors are provided, for example one per axle.

Actuating the vehicle electric motor makes it possible to achieve a braking torque at which the applied energy is at least partially recovered. Furthermore, the vehicle electric motor may be actuated in a targeted manner in order to create redundancies for the brake modules already described. Depending on the number of vehicle motors used, it is even possible to provide wheel-specific braking torques and for example to implement a yaw moment intervention.

In one embodiment, elastic elements may be provided on at least two wheel brakes for pad recovery of the wheel brakes, wherein the respective elastic element acts such that a clearance is set in the respective wheel brake. Frictional resistance may thus be significantly reduced in the unbraked state, which leads to lower energy consumption when the vehicle is moving. During a braking process, the primary control unit may actuate at least one of the pressure supply devices in order to bridge the clearance, such that the bridging of the clearance is for example imperceptible to the driver. As an alternative or in addition, during a braking process, the primary controller may actuate the vehicle electric motor so as to generate a braking torque while bridging the clearance. The vehicle electric motors may thus be used to provide the missing braking effect when bridging the clearance.

The object mentioned at the outset is furthermore achieved by a method for controlling a vehicle. The vehicle may have a driving dynamics system, as has already been explained above in various embodiments. The method may comprise the following steps:

a (master) primary control unit outputting a control command, comprising a steering command and/or a braking command;

at least one (slave) controller of a brake module, in particular a first or second brake module, receiving the control command;

a detection unit monitoring the vehicle situation;

at least one actuator carrying out the control command when the detection unit indicates that the vehicle is in a normal situation; or the (slave) controller carrying out an at least partially modified control command, in particular an ABS/ESP or yaw moment intervention for stable braking of the vehicle with maximum deceleration, when the detection unit indicates that the vehicle is in a risky situation.

Advantages similar to those already explained in connection with the device also result with regard to the method.

One aspect of this embodiment is that, in order to implement a more efficient control strategy, the primary control unit may in principle issue control commands that are implemented or put into practice by one or more brake modules. To this end, the brake modules actuate the actuators assigned to them. At the same time, however, the vehicle situation is monitored. If it is determined that the vehicle is in a critical situation, the control commands may be modified. This also includes a certain control command not being carried out at all. Thus, in said risky situations, controlling of the modules that endangers the vehicle and/or the occupants of the vehicle may be avoided. Known safety and comfort functions may be provided such that they cannot easily be overridden by the primary control unit.

The detection unit may recognize imminent locking of at least one wheel and/or imminent skidding of the vehicle during an attempt to steer and/or imminent spinning of at least one wheel as a risky situation.

The object mentioned at the outset is furthermore achieved by a computer-readable medium comprising instructions for performing said method. This preferably requires the instructions to be executed on at least one computing unit.

BRIEF DESCRIPTIONS OF THE DRAWINGS

The invention is described below by way of several exemplary embodiments, which are explained in more detail with reference to drawings. In the figures.

DETAILED DESCRIPTION

Figure 1:
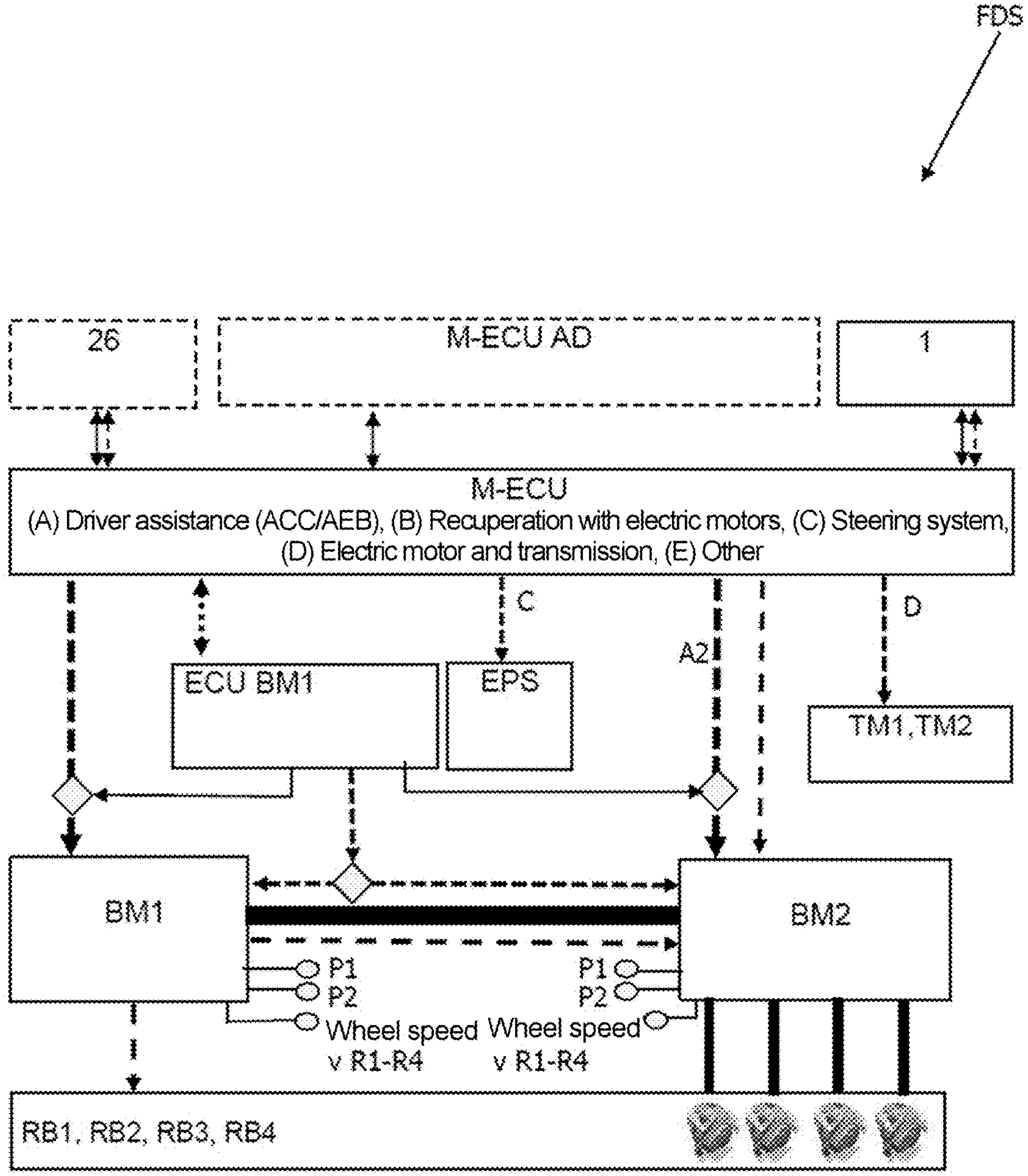
FIG. 1 shows one possible architecture of the driving dynamics system according to the invention, comprising a primary control unit, a first and second brake module, a steering actuator and vehicle electric motors.

In the following description, the same reference numerals are used as far as possible for identical and functionally identical parts.

FIG. 1 shows one possible architecture for implementing the driving dynamics system FDS according to the invention.

This exemplary embodiment of the driving dynamics system FDS is advantageously distinguished in that central access to a brake system and a steering system of a vehicle is provided by different controllers or domains for piloted and autonomous driving, such that the driving dynamics of a vehicle are controlled centrally by setpoint control signals being sent to the steering system and the brake system.

The driving dynamics system FDS in this case preferably comprises:

- an electric steering actuator (power steering system EPS), which acts on a vehicle axle and adjusts a steering angle and a steering torque of a vehicle axle;
- a first brake module BM1;
- a second brake module BM2;
- a brake module controller ECUBM1, ECUBM2 for the first and second brake module BM1, BM2;
- a primary control unit M-ECU;
- an AD controller.

Figure 7:
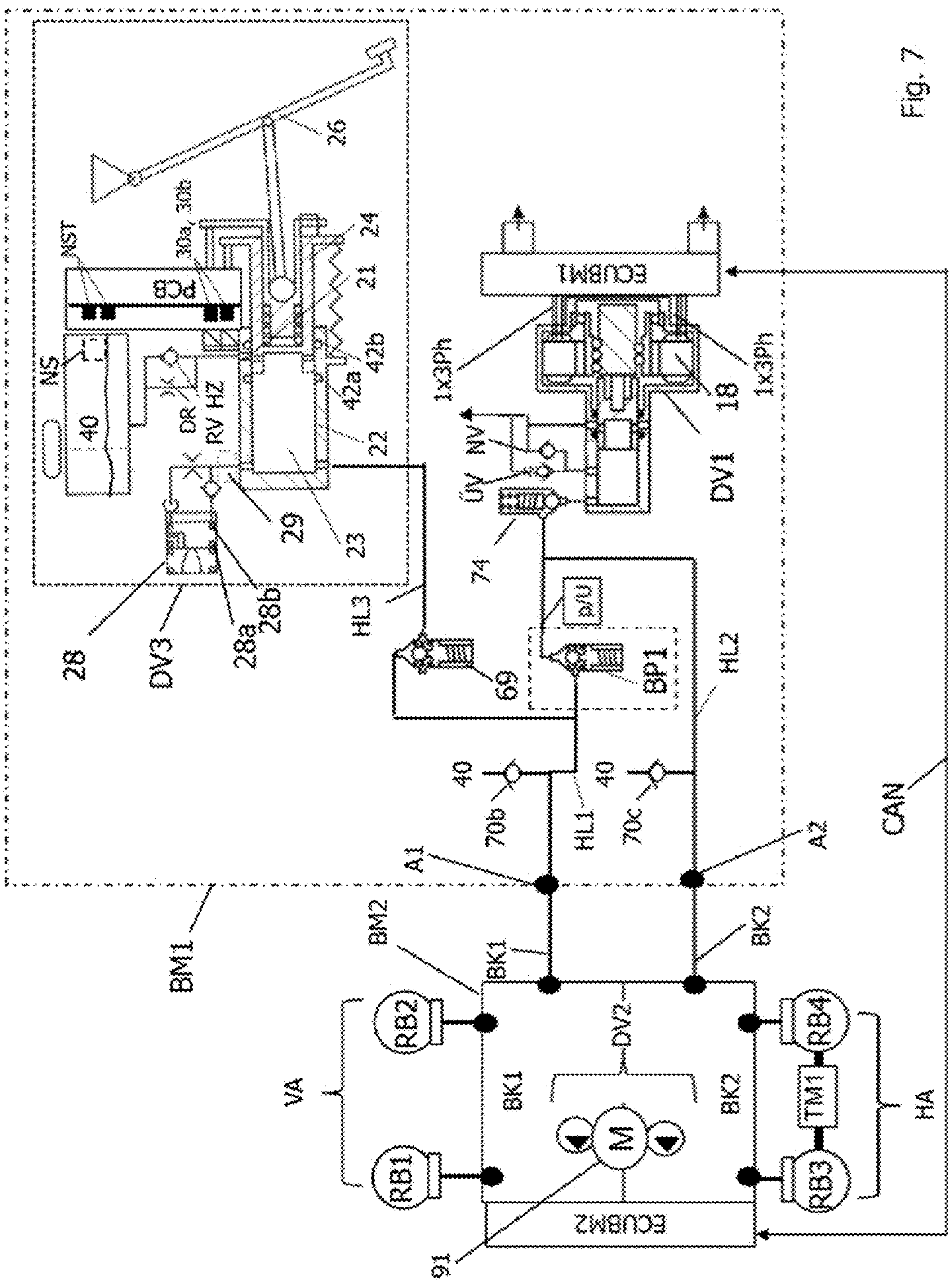
FIG. 7 shows a schematic depiction of a first brake module with a connected second brake module.

The brake modules BM1, BM2 may also be divided into a primary brake module BM1 and secondary brake module BM2, wherein all primary functions of the driving dynamics (brake force boosting with electronic brake force distribution, ABS/ESP, steering and torque vectoring, standstill brake) are provided redundantly in the driving dynamics system FDS according to this exemplary embodiment. An electrohydraulic brake force booster with a travel simulator 28 is preferably used as brake module BM1. In one exemplary embodiment, this is a brake module BM1 as illustrated in FIG. 7 or 8.

Figure 8:
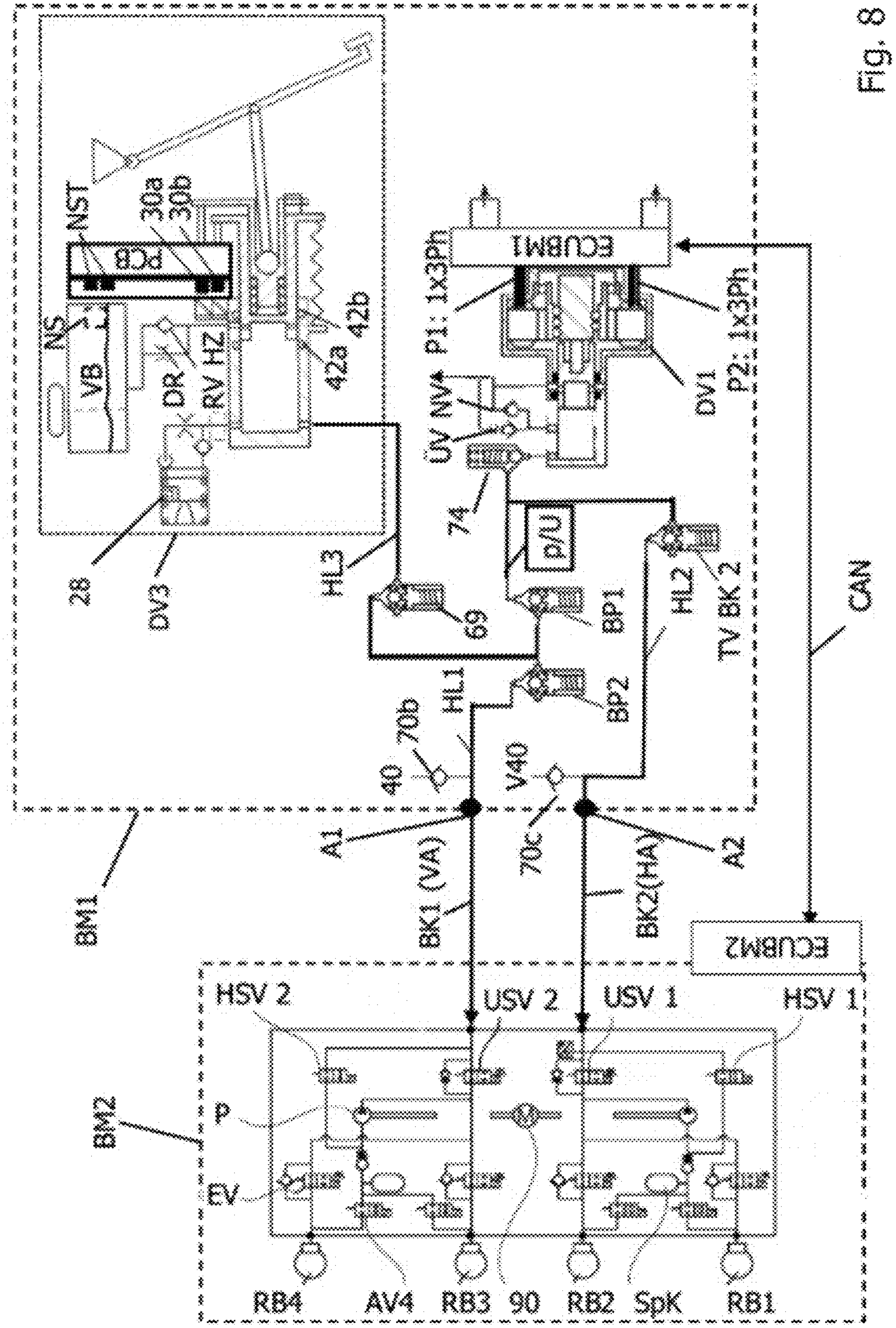
FIG. 8 shows a schematic depiction of a first brake module with a connected second brake module.

A standard ESP system may be used as second brake module BM2, this being modified with regard to external actuation of the solenoid valves via an interface (cf. for example FIG. 8). The first and the second brake module BM1, BM2 are connected via at least one hydraulic line, wherein the exemplary embodiment of FIG. 1 illustrates a series arrangement in which a pressure built up by the first brake module BM1 is transmitted to wheel brakes RB1-RB4 indirectly via the second brake module BM2. Concrete examples of a series arrangement of the brake modules BM1, BM2 may be seen in FIG. 7, 8.

In addition to the brake modules BM1, BM2 and the steering actuator (for example power steering system, EPS), use is preferably made of at least one powerful electric vehicle electric motor TM1, TM2 with a power>30 kW, which is likewise integrated into the driving dynamics system FDS. Synergy effects of the brake modules BM1, BM2 with the vehicle electric motor TM1, TM2 in terms of maximizing the recuperation of kinetic energy when braking may advantageously be utilized in some exemplary embodiments of the invention, wherein the pressure control during recuperation, the electric brake force distribution to the front axle VA and rear axle HA (cf. FIG. 3, 4, 5) may be adapted as needed according to the recuperation power of the vehicle electric motors TM1, TM2.

Figure 14:
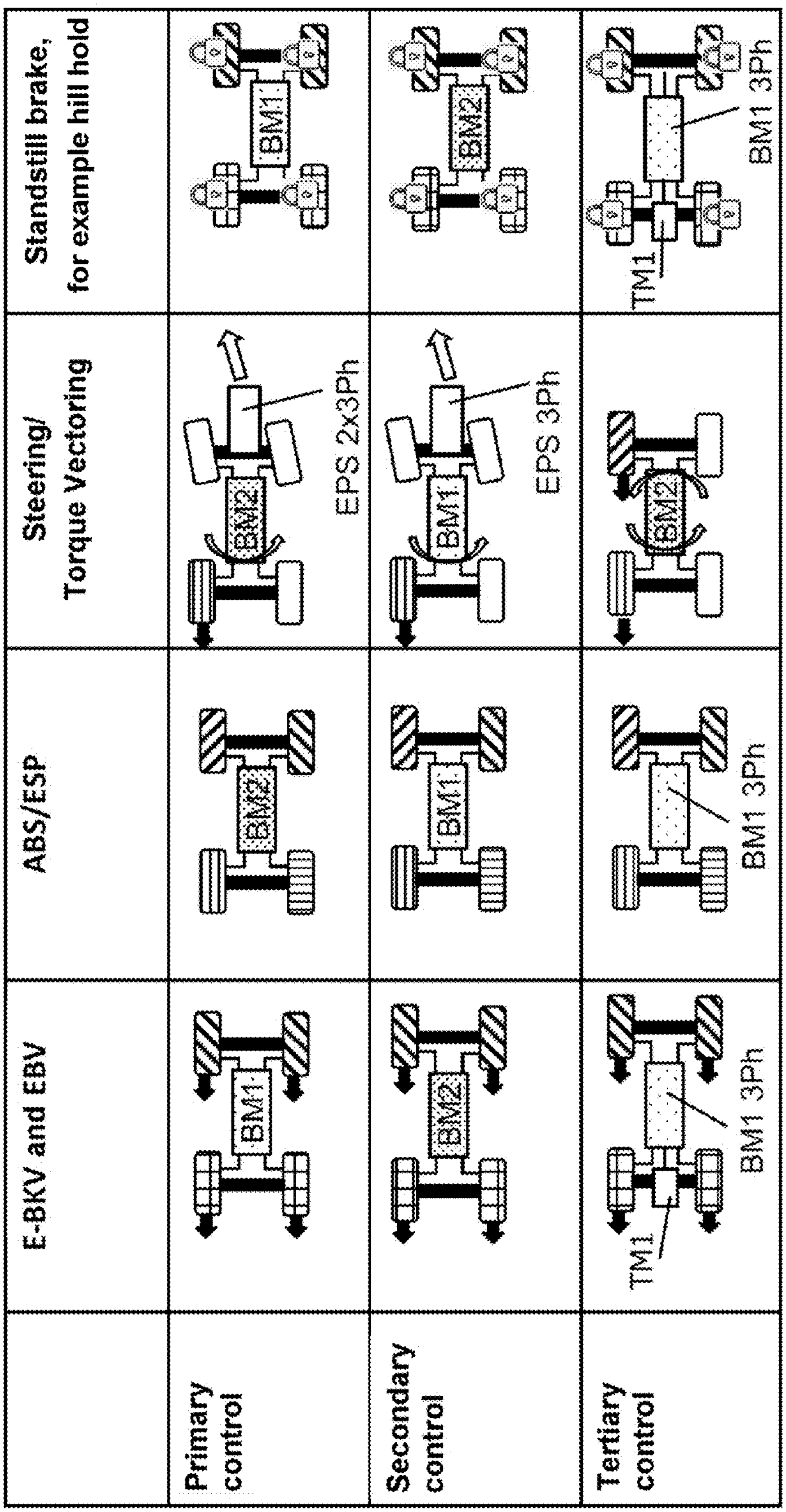
FIG. 14 shows an overview of the available redundancies.

In some exemplary embodiments, the brake modules BM1, BM2 interact with the electric power steering system EPS and, on the one hand, improve agility through yaw moment interventions, wherein one or more wheel brakes RB1-RB4, each of which is assigned to wheels R1-R4 (for example FIG. 3), are activated. According to one exemplary embodiment, both the driving dynamics and the efficiency of the vehicle may be optimized in an active mode by maximizing the recuperation of braking energy. In the event of failure of individual components, the driving dynamics system FDS, at least in some exemplary embodiments, offers triple redundancy of the primary functions, as is illustrated in FIG. 14 by way of example.

In the exemplary embodiment, a controller for autonomous driving, hereinafter AD control unit M-ECUAD, controls and plans autonomous driving. The primary control unit M-ECU controls piloted driving and receives control commands from the AD control unit M-ECUAD. In the described exemplary embodiment, the primary control unit M-ECU controls a large number of actuators during autonomous and piloted driving mode. The primary control unit M-ECU is able to read in driver request signals, which are input for example via an actuator element 26, for example a brake pedal, and an accelerator pedal 1.

In one exemplary embodiment, the driver request signals are transmitted redundantly. The primary control unit M-ECU sends setpoint values or braking commands to the brake modules BM1, BM2, the electric power steering system EPS and the one or more vehicle electric motors TM1, TM2. For brake management, the signals are sent either directly to the actuators or to the brake management system of the brake module controller ECUBM1. If the signals are sent directly, the signals are preferably monitored and authorized by the brake module controller ECUBM1. In one exemplary embodiment, there may be a restriction to non-safety-critical control signals. For safety-critical functions, such as for example ABS/ESP or ASR interventions, the control takes place via a first brake module controller ECUBM1. The first brake module controller ECUBM1 preferably also monitors the setpoint signals in the case of torque vectoring interventions in order to improve the agility of the vehicle, since torque vectoring interventions may influence stability and safety. The provision of a dedicated control unit in the form of the AD control unit is optional. In one exemplary embodiment, their functions are implemented in the primary control unit M-ECU. As an alternative, the described driving dynamics system FDS may also be operated without the AD control unit M-ECUAD.

In the exemplary embodiment according to FIG. 1, manufacturers of the modules (brake, steering system) may initially receive access to their units for specific functions. The driving dynamics modules such as brake module BM1, BM2 (system module A and B), electromechanical steering actuator (system module C) and electric drive (for example vehicle electric motor TM1 and/or TM2) (system module D) then become executing actuators of the primary control unit M-ECU. By way of example, the primary control unit M-ECU in turn transmits signals or control commands to the brake system, which are carried out by the first brake module BM1 (primary function) and the second brake module BM2 (secondary function). The brake modules BM1, BM2 may be accommodated in one or in separate housings-what are known as 1-box or 2-box solutions. The signals or commands may be setpoint signals for the desired braking torque on the wheel brakes RB1-RB4, in particular setpoint pressures or setpoint pressure characteristics for driver assistance functions (DA), including active cruise control (ACC) and emergency braking function (AEB), as well as setpoint values for the recuperation mode of the vehicle electric motor TM1 and/or TM2. According to the invention, in recuperation mode, the hydraulic braking torque may be reduced and, in some cases, completely set to zero if braking is carried out exclusively via the vehicle electric motor TM1 and/or TM2 at low speeds.

In some exemplary embodiments, use is made of multiple vehicle electric motors TM1, TM2 on multiple axles, in particular on the front axle VA and the rear axle HA. In these exemplary embodiments, the electric brake force distribution (EBV) is of great importance because different axle load distributions and power designs of the vehicle electric motors TM1, TM2 are common. In driving mode, the brake force distribution therefore has to be adjusted dynamically according to the invention.

A further advantage of the invention is that driving dynamics interventions via torque vectoring may be carried out firstly to improve the agility of the vehicle when cornering in combination with an electric power steering system EPS. In this case, the brake modules BM1, BM2 may be used to generate yaw moments in a targeted manner through wheel-specific brake pressure control.

In one exemplary embodiment, this intervention is performed via the second brake module BM2 (possibly also the ESP unit). In another exemplary embodiment, the intervention takes place via the first brake module BM1 with pressure control via a first pressure supply device DV1, for example using the inlet valves EV1-EV4 (cf. for example FIG. 10). The yaw moment control via the first brake module BM1 has the advantage of higher dynamics, since it is possible to use a powerful brushless EC motor (cf. for example drive 18 from FIG. 7).

In one exemplary embodiment, the precision of the PPC pressure control is improved. For this purpose, the second brake module BM2 is modified in such a way that the inlet valves EV1-EV4 are able to be actuated by the first brake module BM1 or the primary control unit M-ECU. In this exemplary embodiment, measured signals from the second brake module BM2, such as for example pressure measurements, may be read by the first brake module BM1 or the primary control unit M-ECU.

The brake system may be designed such that a first and/or second brake module controller ECUBM1, ECUBM2 controls the interventions of the primary control unit M-ECU and, if necessary, authorizes the control if the vehicle is in a safe state. In an unsafe state, the first and/or second brake module controller ECUBM1, ECUBM2 may take control and/or modify control commands or setpoint values.

The yaw moment interventions via pressure actuators (for example via the first and/or second pressure supply unit DV1, DV2) are highly relevant for autonomous driving starting from SAE Level 4. According to the invention, in the event of failure of the electric power steering system EPS, steering may be performed dynamically through the wheel-specific pressure control of the wheel brakes RB1-RB4. The vehicle may thereby be guided safely into a non-dangerous zone away from the road. Complete steering of the vehicle is possible at low speeds with any loss of comfort.

In one exemplary embodiment, an electric motor of an electromechanical power steering system EPS is designed with 2×3 phases and a redundant ECU. This may reduce the failure rate of the electric power steering system EPS from 100 fits to 10 fits and thus significantly increase availability. In the event of failure of 1×3 phases, the steering mode may then still be kept operational with less dynamics and may be supported, in dynamic driving mode, by yaw moment interventions via the brake modules BM1, BM2.

The same applies to the brake system. In one exemplary embodiment, the windings of the drives of the pressure supply units DV1, DV2 and the associated ECUs are also designed to be redundant. In the event of failure of a 1×3 phase branch, the pressure may still be controlled with less dynamics and, for example, approximately 50% of the rated pressure of the pressure supply units DV1, DV2.

In the event of failure of the electric power steering system EPS, the emergency steering is controlled by at least one of the brake module controllers ECUBM1, ECUBM2.

In the exemplary embodiment according to FIG. 1, at least one of the brake modules BM1, BM2 is designed to be redundant, and so provision is made for redundant electronics, 2×3 phase connections and connections to two on-board power systems P1 and P2. Furthermore, in the event of failure of one pressure supply DV1, DV2, the second, still functional pressure supply unit DV1, DV2 may take control.

According to the invention, as shown in the exemplary embodiment, provision may furthermore be made for redundant communication between the modules. Both brake modules BM1 and BM2 redundantly read in the wheel speed sensors from the four wheels R1-R4. As an alternative, one of the brake modules, for example the second brake module BM2, transmits the measured wheel speed values via an interface, for example CAN bus (CAN), to the other brake module, for example the first brake module BM1.

In one exemplary embodiment, access to at least some of the valves (for example the inlet valves EV1-EV4 and/or outlet valves AV1-AV4) of the second brake module BM2 is configured by the first brake module BM1 via an interface.

In one exemplary embodiment, the primary control unit M-ECU accesses the brake calipers directly, wherein the brake caliper may have an electric parking brake (EPB) on two wheels. In one exemplary embodiment, the brake caliper is designed such that there is a clearance and no residual friction occurs in the brake system when the brake is not actuated. Due to the variable clearance caused by environmental factors, the brake control is adjusted such that the driver is not able to perceive any changed pedal characteristic in brake-by-wire mode. For this purpose, deceleration may be performed by way of the vehicle electric motors TM1, TM2 in order to bridge the clearance.

Figure 2:
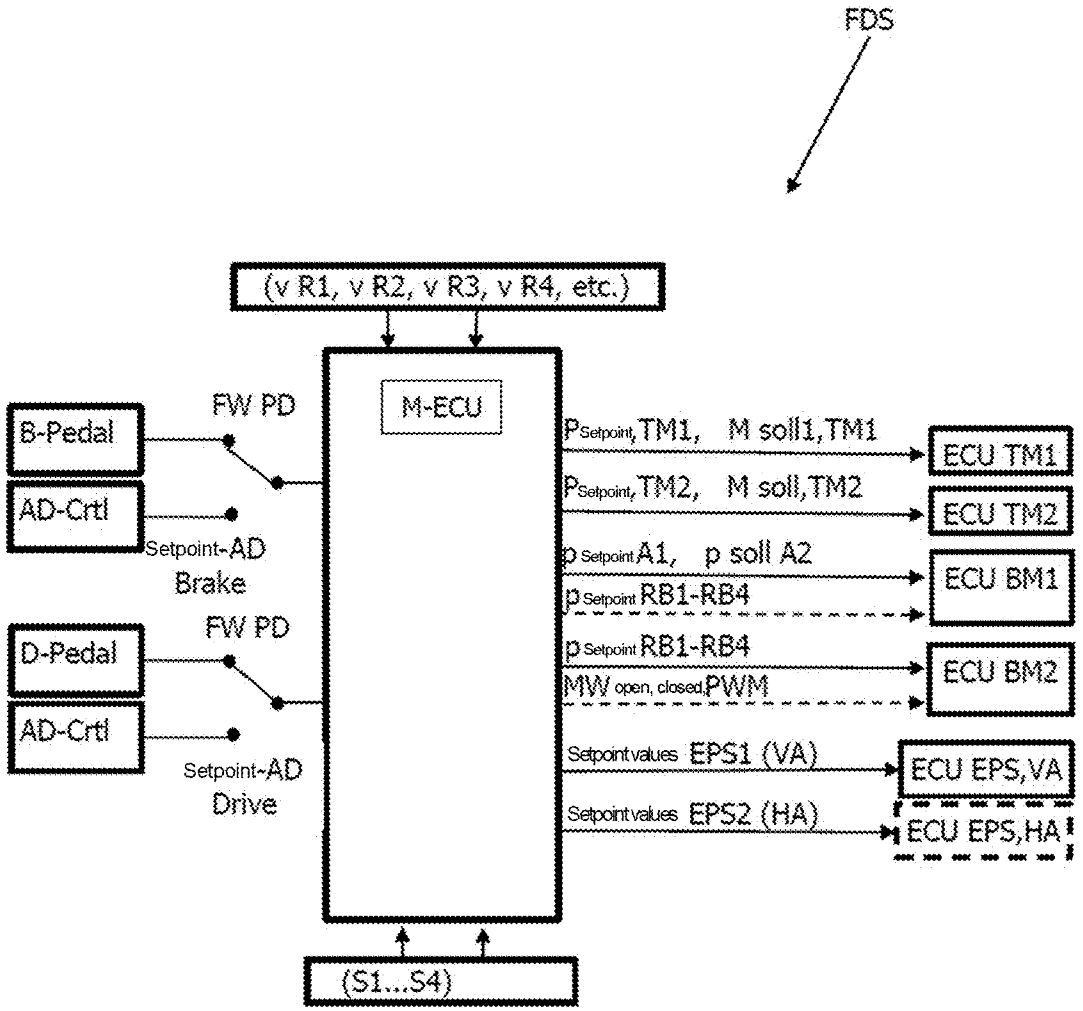
FIG. 2 shows an overview of the signal inputs and outputs of the primary control unit from FIG. 1.

FIG. 2 illustrates inputs and outputs of the primary control unit M-ECU. This is illustrated in the middle. The inputs from the AD control unit and the inputs of the accelerator pedal 1 and of the actuation element 26, for example the brake, are on the left-hand side. It may be seen from FIG. 2 that a selection may be made as to whether signals from the accelerator pedal 1 or from the AD control unit should be received with regard to the acceleration of the vehicle. Accordingly, a selection may be made between signals from the actuator element 26—the brake—and in turn the AD controller. Ultimately, the primary control unit M-ECU receives control commands, in particular steering and braking commands, either from the AD control unit or from the respective actuator elements.

The primary control unit M-ECU furthermore receives signals from speed sensors that indicate for example the rotational speed of the individual wheels R1-R4 (cf. VR1-VR4). The primary control unit M-ECU in turn outputs control signals to the individual actuators.

FIG. 2 indicates, by way of example, the first and second brake module controller ECUBM1, ECUBM2 and other controllers ECUTM1, ECUTM2, ECUEPS-VA, ECUEPS-HA. Unlike in FIG. 1, provision is made for two separate controllers for the first brake module BM1 and the second brake module BM2 in the exemplary embodiment according to FIG. 2.

Figure 3:
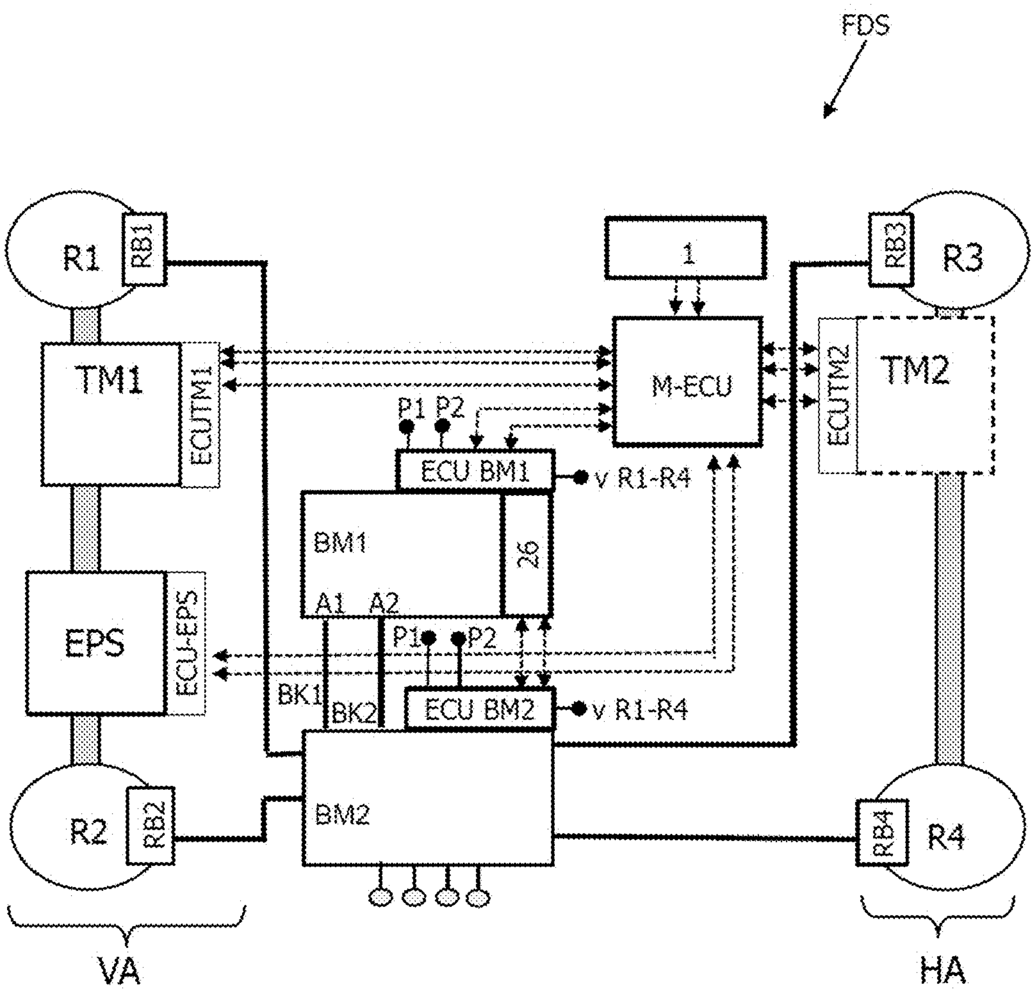
FIG. 3 shows a first exemplary embodiment of the invention with an electronic pedal and an integrated brake pedal module.

A corresponding detailed configuration will become apparent from FIG. 3. A driving dynamics system FDS of a vehicle is shown schematically here. The wheels R1, R2 are arranged on a front axle VA. Accordingly, the wheels R3, R4 are arranged on a rear axle HA. The front axle VA and the rear axle HA are driven by vehicle electric motors TM1 and TM2, respectively. The respective vehicle electric motors TM1, TM2 have controllers (cf. ECUTM1, ECUTM2). As illustrated by the broken lines in FIG. 3, the second vehicle electric motor TM2 is optional. The wheel brakes RB1-RB4 are each assigned to the individual wheels R1-R4. The wheel brakes RB1-RB4 are supplied with pressure medium by the second brake module BM2 via hydraulic lines. This does not necessarily mean that the second brake module BM2 provides the corresponding brake pressure. All that is illustrated is that fluid is distributed using lines of the second brake module BM2. The second brake module BM2 is in turn fluidly connected to the first brake module BM1 via two connection points A1, A2. A first brake circuit BK1 and a second brake circuit BK2 are supplied with pressure medium via the connection points A1, A2. Respective dedicated brake module controllers ECUBM1, ECUBM2 are assigned to the two brake modules BM1, BM2. The power steering system EPS with the associated controller is located on the front axle VA. As already described, the primary control unit M-ECU receives signals from an electric accelerator pedal 1. The signal path between the accelerator pedal 1 and the primary control unit M-ECU is designed to be redundant. There are accordingly redundant communication paths or communication connections to the controllers of the first vehicle electric motor TM1, of the second vehicle electric motor TM2 and of the first brake module BM1. These communication connections may be designed to be wireless or wired. In some cases, multiple redundancy is recommended, as illustrated by way of example between the primary control unit M-ECU and the vehicle electric motors TM1, TM2. In the case of corresponding multiple redundancy, a partially wired and a partially wireless connection via radio may also be implemented.

The second brake module BM2 or the brake module controller ECUBM2 is connected only to the first brake module BM1 or the first brake module controller ECUBM1 in terms of communication. The primary control unit M-ECU thus communicates indirectly with the second brake module controller ECUBM2 via the first brake module controller ECUBM1.

What is characteristic of the exemplary embodiment according to FIG. 3 is that the brake actuation element 26 is part of the first brake module BM1. A braking request exerted via the brake pedal is thus received directly by the first brake module controller ECUBM1 and, where applicable, implemented in cooperation with the second brake module controller ECUBM2.

Figure 4:
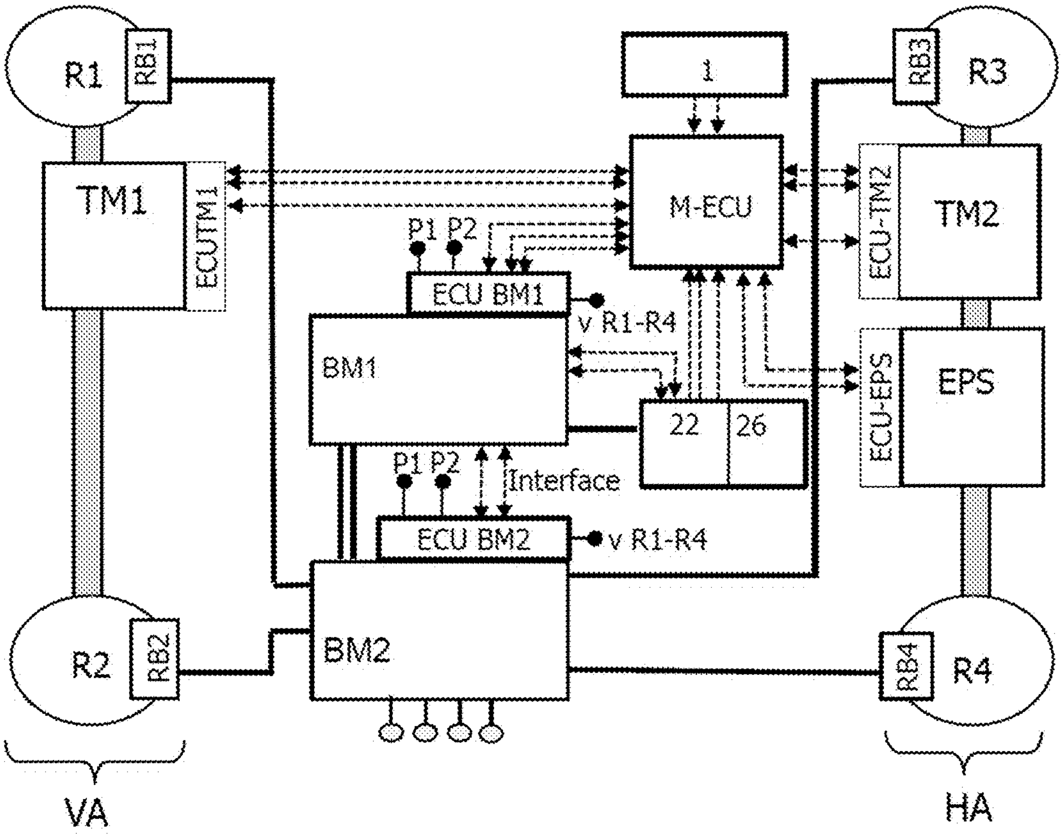
FIG. 4 shows a second exemplary embodiment with a separate brake pedal module.

In contrast, the exemplary embodiment according to FIG. 4 has a separate module having a master brake cylinder 22 and the actuation element 26 for actuating the piston 24. Sensors, for example pedal travel sensors 30*a*, 30*b*, may be received by the first brake module controller ECUBM1. In the exemplary embodiment shown, there is a fluid connection between this additional module and the first brake module. This means that, in a fallback level, a brake pressure may be built up via the actuation element 26 and be delivered to the individual wheel brakes RB1-RB4. Corresponding exemplary embodiments are shown in more detail in FIGS. 7 and 8 (cf. third pressure supply unit DV3). For the rest, the system according to FIG. 4 has great similarities to the system according to FIG. 3.

Figure 5:
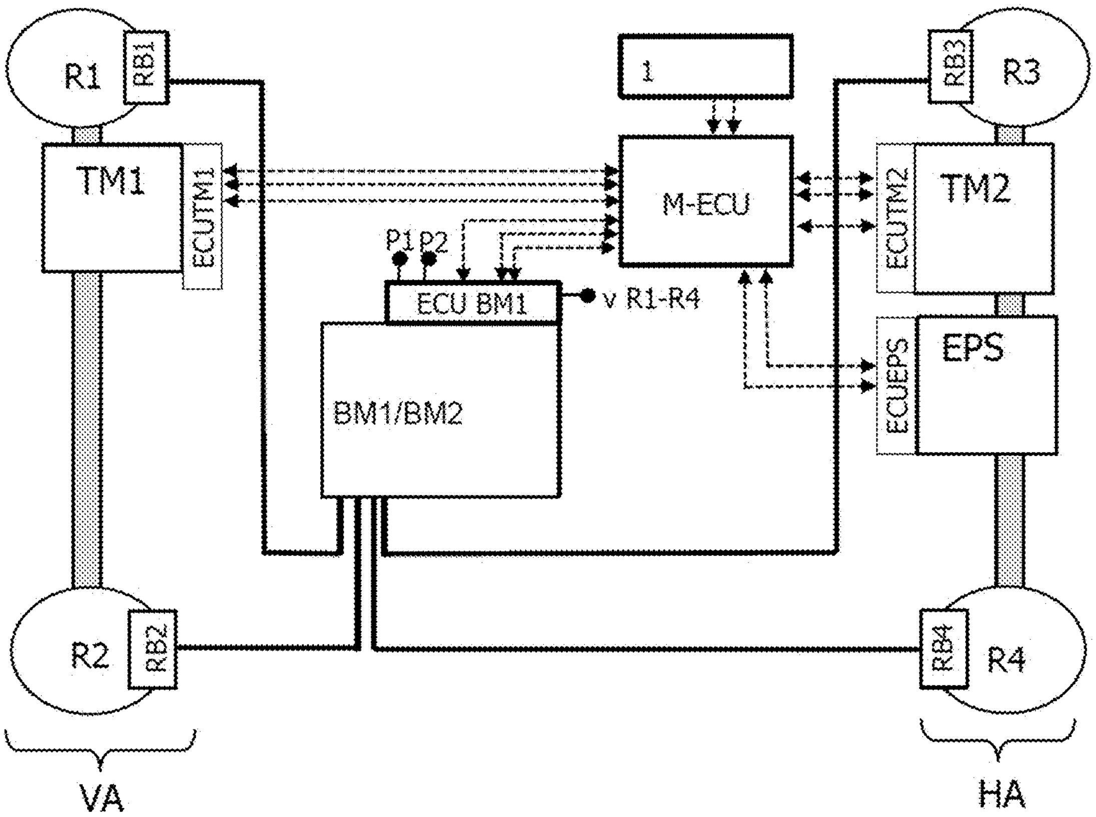
FIG. 5 shows a third exemplary embodiment, in which the first and the second brake module are integrated into a structural unit.
Figure 9:
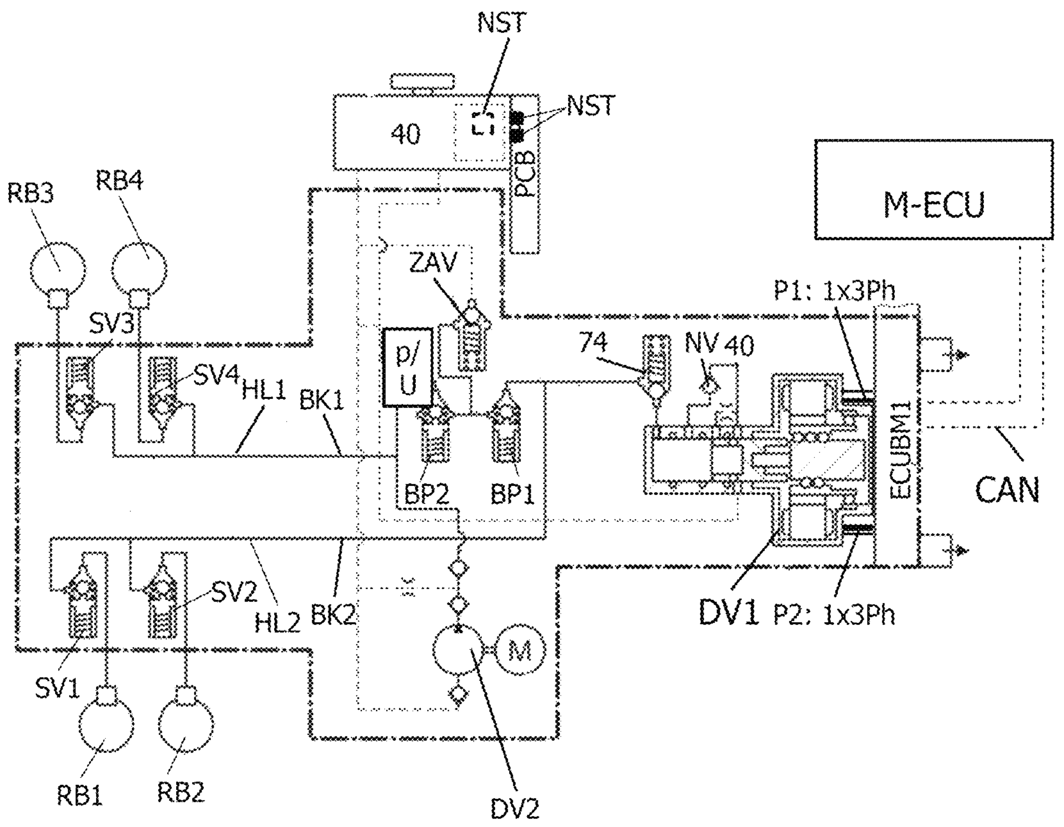
FIG. 9 shows a schematic depiction of an integrated first and second brake module.

In the exemplary embodiment according to FIG. 5, the first brake module BM1 and the second brake module BM2 are combined in a module unit. In what is known as the 1-box solution, the brake modules BM1, BM2 share at least one housing. In the embodiment shown in FIG. 5, a common brake module controller ECUBM1 is used. The controller may also be designed to be redundant; for example, separate controllers ECUBM1, ECUBM2, ECUMV may be provided for each pressure supply and the valve device. The corresponding exemplary embodiment may be designed as shown in FIG. 9.

Figure 6:
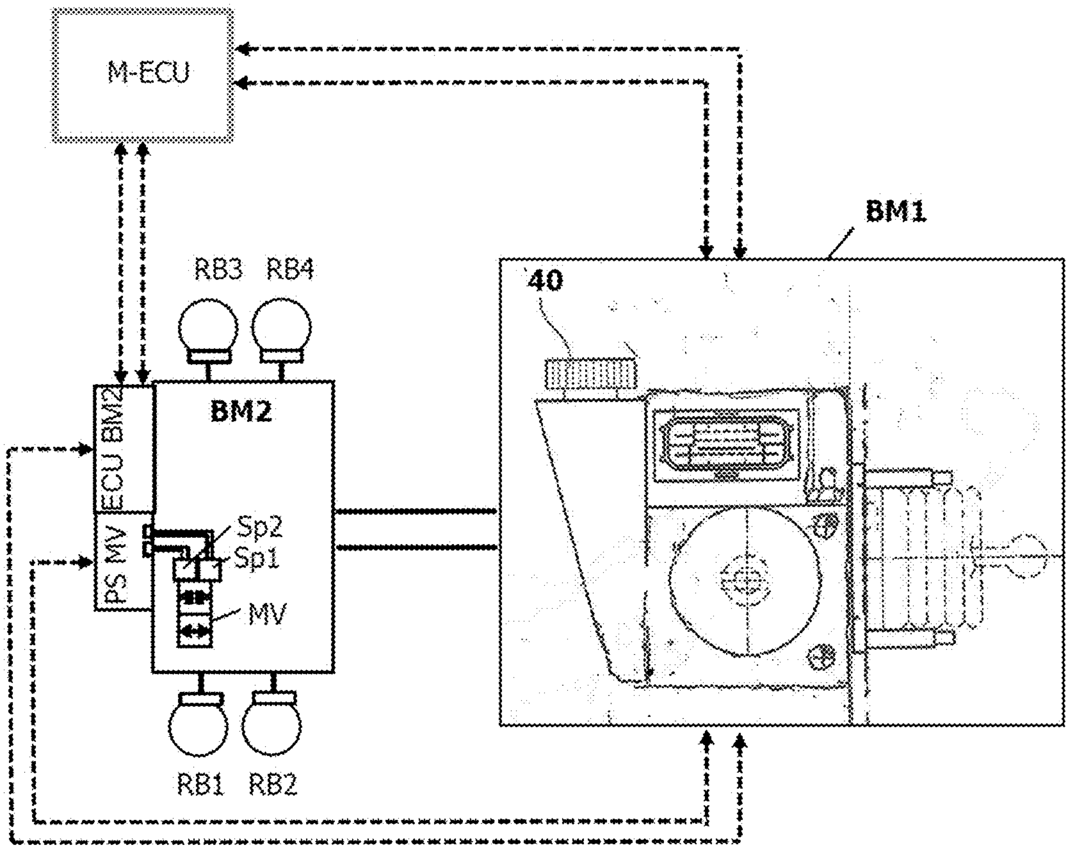
FIG. 6 shows a fourth exemplary embodiment, in which the first and the second brake module are each separately connected to the primary controller in terms of communication.

FIG. 6 illustrates another 2-box solution, in which the first brake module BM1 and the second brake module BM2 are designed separately. In this exemplary embodiment too, there are redundant communication connections between the first brake module BM1 and the second brake module BM2 or the associated first and second brake module controller ECUBM1, ECUBM2. Furthermore, the respective brake module controllers ECUBM1, ECUBM2 are each connected redundantly to the primary control unit M-ECU.

FIG. 7 shows a basic circuit diagram of a brake system having a first and second brake module BM1, BM2. The first brake module BM1 has a first pressure supply unit DV1 with an electromotive drive 18 and a third pressure supply unit DV3 with the master brake cylinder 22 and the actuation element 26.

Figure 10:
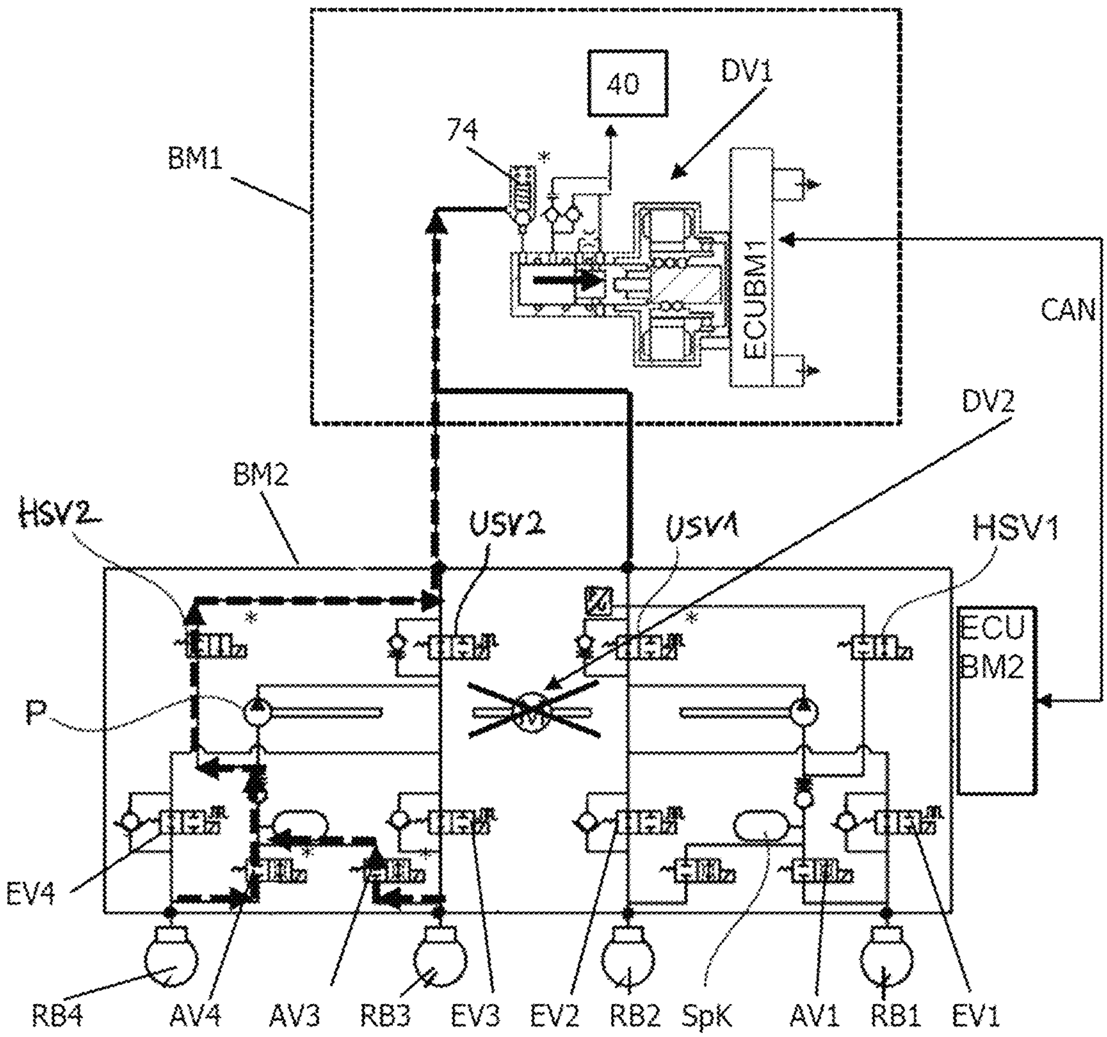
FIG. 10, 11 show a pressure reduction or build-up in the event of a failed motor in the second brake module for braking a vehicle.

The second brake module BM2 comprises an electrically driven motor-pump unit (cf. also detailed explanation regarding the second brake module in FIG. 10) as second pressure supply unit DV2. The second brake module BM2 may be any ESP unit. One suitable ESP unit is described in detail in DE 10 2014 205 645 A1. As an alternative, a standard ABS unit without an ESP function may be used as second brake module BM2. A second brake module BM2 is preferably used, as described below.

The two brake modules BM1, BM2 are configured to apply pressure medium to the two brake circuits BK1 and BK2, wherein the brake modules BM1, BM2 are preferably connected hydraulically in series. Connection points A1, A2 are used for the connection.

The first pressure supply unit DV1 is connected to the first brake circuit BK1 or the corresponding interface via a first hydraulic line HL1. Furthermore, provision is made for a second hydraulic line HL2 for connecting the first pressure supply unit DV1 to the second brake circuit BK2 or the corresponding interface.

According to the exemplary embodiment, the third pressure supply unit DV3 of the first brake module BM1 has a master brake cylinder 22 with a piston 24 and a piston chamber 23. In the exemplary embodiment, the third pressure supply unit DV3 is designed as a single circuit and is connected to the brake circuit BK1 or the corresponding hydraulic interface via a third hydraulic line HL3 and a feed valve 69 (cf. connection point A1). A fluid connection to the second hydraulic line HL2 passes through an optional (illustrated by a dashed outline) first isolation valve BP1. The third pressure supply unit DV3 may be disconnected from the brake circuits BK1, BK2 by closing the feed valve 69 such that, during normal brake-by-wire operation without faults (for example without a brake circuit failure), the actuation element 26 acts only on a travel simulator 28.

In the exemplary embodiment according to FIG. 7, the brake circuits BK1 and BK2 may be separated (disconnected) via the optional first isolation valve BP1, if present (preferably normally open). According to the invention, in the event of failure of the first pressure supply unit DV1, the master brake cylinder 22 of the second pressure supply unit DV2 may thus be connected either only to the first brake circuit BK1 or to the first and the second brake circuit BK1, BK2 by opening the first isolation valve BP1. For this emergency mode, the feed valve 69 is designed as a normally open valve. If current is still present, it is opened in said fault case, such that the third pressure supply unit DV3 is no longer hydraulically decoupled from the brake circuits BK1, BK2.

The first pressure supply unit DV1 likewise acts selectively on the second brake circuit BK2 (first isolation valve BP1 closed) or both brake circuits BK1, BK2 (first isolation valve BP1 open or normally open).

During normal operation, the first isolation valve BP1 is open, such that the first pressure supply unit DV1 supplies pressure to both brake circuits BK1, BK2 and the third pressure supply unit DV3 is decoupled from the first brake circuit BK1 by the closed feed valve 69. If it is determined that pressure medium is being lost from the brake circuits BK1, BK2, the brake circuit BK1 may be decoupled from the first pressure supply unit DV1 by way of the first isolation valve BP1, such that, in the event of a leak in the first brake circuit BK1, the second brake circuit BK2 may continue to be operated without loss of hydraulic medium.

In the exemplary embodiment, the isolation valve BP1 is designed as a solenoid valve, wherein the ball seat of the isolation valve BP1 is connected, via a connection (valve seat connection), to that section of the hydraulic line that leads to the first pressure supply unit DV1. The isolation valve BP1 may thus be securely closed through energization even in the event of failure of the first brake circuit BK1, and is not pushed open by higher pressures during operation of the first pressure supply unit DV1.

When the actuation element 26 is actuated, the third pressure supply unit DV3 feeds the travel simulator 28 via a breather hole in a wall of the master brake cylinder 22, such that a progressive haptic resistance in the form of a return force is able to be felt depending on a magnitude of the actuation of the actuation element 26. The magnitude of the actuation may be understood here to mean how "firmly and/or how far" a driver actuates the actuation element 26, designed as a brake pedal, and thus pushes the piston 24 into the master brake cylinder 22. The progressive haptic resistance is also referred to as pedal characteristic.

Provision may be made for a travel simulator valve 29 for shutting off the connection to the travel simulator 28.

The third pressure supply unit DV3 has at least one breather bore, which is connected to a reservoir 40 via hydraulic lines. The reservoir 40 may be part of the first brake module BM1.

As illustrated, the master brake cylinder 22 has two sealing elements 42*a*, 42*b*, which are designed as ring seals. The breather bore 38 is arranged between the two sealing elements 42*a*, 42*b*. A throttle DR is arranged in the connection between the breather bore and the reservoir 40.

With regard to its flow rate, the throttle DR is dimensioned such that the pedal characteristic is not changed significantly in the event of failure of the sealing element 42*a* (for example 3 mm pedal travel in 10 s). In addition, temperature-induced volume compensation of the pressure medium may be implemented via the throttle DR.

During ABS mode of the second pressure supply unit DV2 of the second brake module BM2, high pressure peaks may occur in the brake circuits BK1 and BK2, these putting a considerable strain on the first pressure supply unit DV1.

In the variant embodiment according to FIG. 8, a pressure-limiting valve UV is connected to the piston chamber of the first pressure supply unit DV1 via a bore, and so the high pressure peaks are reduced and damage to the system is avoided.

A suction valve NV is likewise fluidically connected to the piston chamber of the first pressure supply unit DV1 and enables pressure medium to be replenished from the reservoir 40. The first pressure supply unit DV1 may thus introduce additional pressure medium into the brake circuits BK1, BK2 by itself. An additionally provided breather hole in the cylinder of the first pressure supply unit DV1 enables volume compensation in the starting position of the piston of the first pressure supply unit DV1.

The second pressure supply unit DV2 is illustrated only schematically in FIG. 7. One possible more detailed design will become apparent from FIG. 8. In the schematic illustration, the wheel brakes RB1, RB2 serve a front axle VA of the vehicle and the wheel brakes RB3 and RB4 serve a rear axle HA of the vehicle. The vehicle electric motor TM1 is located on the rear axle HA of the vehicle in order to drive the vehicle. The vehicle may be a purely electric vehicle or a hybrid vehicle, as has already been explained with reference to FIG. 1.

As may be seen from FIG. 8, the first brake circuit BK1 is connected to the wheel brakes RB1 and RB2 and the second brake circuit BK2 is connected to the wheel brakes RB3 and RB4.

The third pressure supply unit DV3 has a separately designed second brake module controller ECUBM2.

The third pressure supply unit DV3 has a printed circuit board PCB that has a level sensor NST that detects the position of a magnetic float NS inside the reservoir 40. The printed circuit board PCB furthermore has sensors 30*a*, 30*b* for detecting the pedal travel and a travel difference between the piston 24 and the pedal travel.

To provide additional pressure medium for the second pressure supply unit DV2, provision is made, in the first brake circuit BK1, for a suction valve 70*b* that connects the pump of the second pressure supply unit DV2 to the reservoir 40.

If the pump of the second pressure supply unit DV2 for the second brake circuit BK2 requires pressure medium, then this may be provided from the reservoir 40 via the suction valve 70*c*.

The two brake circuits BK1, BK2 are thus connected to the reservoir 40 through the respective hydraulic lines HL1, HL2 in each case via a suction valve 70*b* or 70*c* in order to draw in pressure medium. In order to achieve optimum suction of the pressure medium, the suction valve 70*b* and 70*c* preferably has a diameter in the range from 30 mm to 50 mm, and specifically a diameter of 40 mm.

The exemplary embodiment optionally has control of the clearance between brake pads and disk brake. The wheel brakes RB1, RB2, RB3, RB4 (cf. FIG. 8) may be designed as friction-free wheel brakes RB1-RB4. In a brake-by-wire system (see for example FIG. 1), disk brakes with brake pads that are spaced apart with a clearance without pressure in the brake system allow a reduction in frictional resistance. This may be achieved using rollback seals, return springs of the brake pads or by actively retracting the brake pads by generating a negative pressure, as explained by the applicant in EP 2 225 133.

Using the first pressure supply unit DV1, the clearance in the wheel brakes RB1-RB4, which changes during operation, is able to be measured in a wheel-specific or brake circuit-specific manner by evaluating the pressure characteristic. According to the invention, a corresponding measurement may take place in service, but also during operation of the vehicle. The measurement is preferably performed when the vehicle is at a standstill or after braking.

With the known clearance values of the wheel brakes RB1-RB4, when the wheel brakes RB1-RB4 are activated, the clearance is the quickly bridged by way of piston travel control of the first pressure supply unit DV1. In this regard, preference should be given to using a brushless motor as electromotive drive 18 of the first pressure supply unit DV1 with a small time constant, since the clearance may be bridged without the driver perceiving this when the brake is actuated.

In addition, the brake system may be controlled such that the vehicle electric motor TM1 and/or TM2 has a decelerating effect in the clearance phase. A braking effect is thus generated immediately when the brake is actuated.

In one exemplary embodiment of the invention, differences in the clearances of the wheel brakes RB1-RB4 are compensated for by actuating inlet valves EV1 to EV4 of the second brake module BM2 and/or using the vehicle electric motor TM1 and/or TM2 to generate a braking effect at the start of braking. By virtue of the clearance, stick-slip effects in new brake systems may generally be reduced or avoided at low speeds.

In one exemplary embodiment, the brake system, for example the second brake module controller ECUBM2, implements an intermittent brake in the event of failure of the second brake module BM2. By moving the piston of the first pressure supply unit DV1 back and forth between an upper and lower pressure range, locking of the wheels R1-R4 is avoided and steerability is maintained. In this form of braking, no measured values, for example pressure and wheel speeds, are required in comparison with a 1-channel ABS mode.

The intermittent brake leads to sufficient braking distances (approx. 200% of the braking distance with ABS compared to a full-fledged wheel-specific ABS) and acceptable stability by maintaining steerability.

As an alternative to the intermittent brake, the brake system according to FIG. 7 or 8 may be used to implement a 1-channel ABS mode with "select-low" control. This leads to a further worsening of the braking distance (approx. 400% braking distance compared to the braking distance with a full-fledged wheel-specific ABS), but to unrestricted vehicle stability, and is superior to the intermittent brake in terms of this characteristic. In 1-channel ABS mode, measured values such as for example pressure and wheel speeds are required, these being able to be read in by the ESP unit via a communication connection/interface, for example CAN interface.

In order to further increase the availability of the brake system according to the invention according to FIG. 7 or 8, the electromotive drive 18 of the first pressure supply unit DV1 is connected to the first brake module controller ECUBM1 via two redundant three-phase branches, and the electronics are designed to be (partially) redundant. By way of example, two B6 bridges may be provided for each branch. In addition, in at least one exemplary embodiment, the electronics are connected to two redundant voltage supplies (on-board power system P1, P2). The probability of failure of the electromotive drive 18 may thus be reduced by a factor of 4-10, and the fault case (failure of the first pressure supply unit DV1) may be further significantly reduced.

The brake module controllers ECUBM1, ECUBM2 are connected to one another via a communication connection CAN, for example a CAN bus. In this respect, it is possible to send control commands to the second pressure supply unit DV2, these causing actuation of the drive 91 and/or of the provided valves (cf. also FIG. 8).

The following safety-relevant redundancies may be implemented with the brake system according to FIG. 7:

- Ensuring a sufficient braking effect to meet the legal requirements in the event of brake circuit failure, failure a) of the second pressure supply unit DV2, b) of the first pressure supply unit DV1 or c) of the first pressure supply unit DV1 and of the second pressure supply unit DV2 (at the same time), that is to say also meet legal requirements in the event of double faults:
  - Fault case 1—failure of the second pressure supply unit DV2: Deceleration through brake force boosting via the first pressure supply unit DV1 in both brake circuits BK1, BK2;
  - Fault case 2—failure of the second pressure supply unit DV2 and the brake circuit BK1: Deceleration through brake force boosting via the first pressure supply unit DV1, for example on the rear axle;
  - Fault case 3—failure of the second pressure supply unit DV2 and the second brake circuit BK2: Deceleration through the third pressure supply unit DV3, for example on the front axle (first isolation valve BP1 closed)
  - Fault case 4—failure of the first pressure supply unit DV1: Deceleration through brake force boosting via the second pressure supply unit DV2;
  - Fault case 5—failure of the first pressure supply unit DV1 and the first brake circuit BK1 or the second brake circuit BK2: Deceleration through brake force boosting via the second pressure supply unit DV2 in one of the brake circuits BK1, BK2, possibly supported by a vehicle electric motor on one axle;
  - Fault case 6—failure of the first pressure supply unit DV1 and the second pressure supply unit DV2: Braking by master brake cylinder on front axle FA and optionally by vehicle electric motor TM1 on the rear axle HA;
  - Fault case 7—failure of the on-board power system: Braking by third pressure supply unit DV3, if necessary on front axle VA and rear axle HA;
- Electronic brake force distribution (EBV) in the event of failure of the brake module BM2 through pressure generation in the first brake circuit BK1 via the second pressure supply unit DV2 and pressure generation in the second brake circuit BK2 via the first pressure supply unit DV1 with the first isolation valve BP1 closed and controlling the first pressure supply unit DV1 via the sensor system of the third pressure supply unit DV3. This requires an S/W brake circuit split, that is to say the wheels of the front axle VA are connected to the first brake circuit BK1, and the wheels of the rear axle HA are connected to the second brake circuit BK2;
- Controlling the clearance between brake pads and disk brake;
- 4-channel ABS mode and/or yaw moment control when the valves of the second brake module BM2 are actuated
- 1-channel ABS mode or implementation of an automated intermittent brake.

FIG. 8 shows one alternative design of the first brake module BM1 according to FIG. 7. In contrast to the exemplary embodiment according to FIG. 7, a second isolation valve TVBK2 is provided in the second hydraulic line HL2 in FIG. 8. This second isolation valve TVBK2 makes it possible to hydraulically decouple the second brake circuit BK2 from the first pressure supply unit DV1. The first pressure supply unit DV1 may thus selectively provide pressure medium in the first brake circuit BK1 or in the second brake circuit BK2 or in both brake circuits. When a loss of volume is detected in the second brake circuit BK2, the latter may be decoupled.

The exemplary embodiment according to FIG. 8 also differs in that a third isolation valve BP2 is provided in the first hydraulic line HL1 between the first isolation valve BP1 and the first connection point A1 for the first brake circuit BK1. This third isolation valve BP2 is preferably arranged such that the third hydraulic line HL3 opens into the first hydraulic line HL1 in a hydraulic connection between the first isolation valve BP1 and the third isolation valve BP2. The third isolation valve BP2 makes it possible to hydraulically decouple the first brake circuit BK1 both from the first pressure supply unit DV1 and from the third pressure supply unit DV3. In the event of failure of the first pressure supply unit DV1, it is thus possible to introduce pressure medium into the second brake circuit BK2 from the third pressure supply unit DV3 via the feed valve 69, the first isolation valve BP1 and the second isolation valve TVBK2. When the third isolation valve BP2 is closed, no pressure medium is released into the first brake circuit BK1.

The following safety-relevant redundancies may be implemented with the exemplary embodiment according to FIG. 8:

- Ensuring a sufficient braking effect in the event of failure of the one or more pressure supply units,
  - Fault cases 1-7: see exemplary embodiment according to FIG. 7;
  - Fault case 8—failure of the feed valve 69 (for example not sealtight) or failure of the electrical actuation: Closure of the third hydraulic line HL3 by the isolation valves BP1 and BP2, such that
  - the travel simulator 28 is fully effective; first pressure supply unit DV1 adjusts wheel pressures in brake circuit BK2 and/or second brake module BM2 in both brake circuits BK1 and BK2,
  - A further degree of freedom: optional feeding of the pressure of the master brake cylinder 22 into brake circuit BK1 or BK2 in the event of failure of one brake circuit BK1, BK2;
- Ensuring 4-channel ABS control and/or yaw moment control when the valves of the second brake module BM2 are actuated;
- 2-channel ABS mode using the select-low and select-high method or 1-channel ABS using the select-low method with wheel speed sensors;
- Electronic brake force distribution (EBV) in the event of failure of the second brake module BM2 (ESP unit) through pressure generation in brake circuit BK1 via the third pressure supply unit DV3 and pressure generation in the brake circuit BK2 via the first pressure supply unit DV1 with the first isolation valve BP1 closed and controlling the pressure supply via the sensor system of the third pressure supply unit DV3. This requires S/W brake circuit distribution, and the brake force distribution into the brake circuits is controlled via the isolation valves BP1, BP2 and TVBK2. According to the invention, the piston of the first pressure supply unit DV1 may be controlled in terms of forward and return stroke so as to apply a suitable pressure. Optionally, pressure may be adjusted via PWM control of the valves, in particular of the isolation valves;
- Clearance control has already been explained in the exemplary embodiment according to FIG. 7. The exemplary embodiment according to FIG. 8 offers the additional potential of compensating for the unequal clearance in the wheel brakes RB1, RB2, RB3, RB4 of the brake circuits BK1, BK2 through appropriate pilot control before the brake force booster mode by sequentially opening the isolation valves BP1, TVBK2. As an alternative, the PWM mode may also be used such that different flow cross sections to the brake circuits BK1, BK2 are set and the unequal clearance may thus be compensated for simultaneously. An S/W brake circuit division is suitable here. This method is easily possible because the brake circuit isolation valves are part of the second brake module BM2 and may be implemented without a delay and susceptibility to faults (for example using an interface between the first and second brake module BM1, BM2). The brake system may thus for example be designed such that no clearance is provided on the front axle on the brake pads and a clearance is provided on the rear axle. A failure of the first pressure supply unit DV1 thus also does not lead to a delay in braking if pressure is generated by the actuation unit and acts, according to the invention, on the wheel brakes RB1, RB2, RB3, RB4 of the front axle VA. In addition, a greater braking effect is able to be generated with the front axle VA.

FIG. 9 shows a further exemplary embodiment. In this case, the first and second brake module BM1, BM2 are combined in a housing. Like the exemplary embodiments described above, the corresponding module has a reservoir 40 as well as the level sensor NST and the float NS. Only a first pressure supply unit DV1 and a second pressure supply unit DV2 are provided in the embodiment. The first pressure supply unit DV1 is essentially identical to the first pressure supply unit DV1 from the exemplary embodiments according to FIGS. 7 and 8.

As an alternative to the illustrated embodiment, it is also possible to use a rotary pump, in particular a gear pump or a single-circuit piston pump with one or more pistons driven by an eccentric mechanism. If a gear pump is used, pressure may be reduced via the gear pump; with a piston pump, pressure cannot be reduced via the rotary pump. The second pressure supply unit DV2 is a single-circuit pump, in particular a piston pump with one or more eccentric mechanisms, which is connected to the first brake circuit BK1 via the first hydraulic line HL1. Bidirectional switching valves SV3 and SV4, to each of which the wheel brakes RB3 and RB4 are assigned, are attached to the first brake circuit BK1. Bidirectional switching valves SV1 and SV2, to each of which the wheel brakes RB1 and RB2 are assigned, are attached to the second brake circuit BK2. The bidirectional switching valves SV1-SV4 each serve to build up and reduce pressure in the wheel brake RB1-RB4 assigned thereto. The first pressure supply unit DV1 is optionally connected, via the fourth isolation valve 74, to the second hydraulic line HL2 that supplies the second brake circuit BK2. The first hydraulic line HL1 and the second hydraulic line HL2 may be connected to one another via the isolation valves BP1 and BP2. In this respect, it is possible for the first pressure supply unit DV1 to provide pressure medium both in the first brake circuit BK1 and in the second brake circuit BK2. The first pressure supply unit DV1 may also be used to actively reduce the pressure of fluid from the wheel brakes RB1-RB4 by resetting the piston or changing the direction of rotation of the gear pump. When the isolation valve BP1 and/or BP2 is closed, the first pressure supply unit DV1 adjusts the pressure only in the second brake circuit BK2.

Accordingly, for example, when the third isolation valve 74 is closed, the second pressure supply unit DV2 is able to set a predetermined pressure due to the isolation valves BP1 and BP2, independently of the first pressure supply unit DV1, in both brake circuits BK1 and BK2. This configuration allows the functions to be taken over, at least in part, by the second pressure supply unit DV2 in the event of failure of the first pressure supply unit DV1. Conversely, in the event of failure of the second pressure supply unit DV2, the functions may be taken over, at least in part, by the first pressure supply unit DV1.

A further aspect of the exemplary embodiment according to FIG. 9 is that a central outlet valve ZAV is provided. This central outlet valve ZAV is fluidically connected to the reservoir 40 by way of one opening. The other opening opens into a hydraulic line section between the isolation valve BP1 and the isolation valve BP2. Due to the hydraulic arrangement, it is possible for the central outlet valve ZAV to be used to release pressure from each of the wheel brakes RB1-RB4. Similarly to the exemplary embodiments described above, this results in numerous redundancies that also cover the failures of one or more of the described valves. In the event of failure of a wheel circuit, the wheel circuit may thus be decoupled by closing the switching valve and the system may still be operated in 3-circuit mode. In the event of brake circuit failure, the corresponding brake circuit is disconnected via the isolation valve BP1 or BP2 and only one brake circuit is still operated with a pressure supply, wherein pressure is built up via the active pressure supply and pressure is built up via the ZAV valve or the pressure supply in the case of the embodiment as a piston-cylinder unit or gear pump.

The exemplary embodiment according to FIG. 9 also has a brake module controller ECUBM1, which is connected to the primary control unit M-ECU via a redundantly designed CAN bus.

FIGS. 10 to 13 show basic circuit diagrams of a second brake module BM2, as may be used for example in connection with the exemplary embodiment according to FIG. 8. In addition to the pump P with the motor 91 ("M"), provision is made for the valves HSV1 and HSV2, USV1 and USV2, inlet and outlet valves EV1-EV4 and AV1-AV4 assigned to the wheel brakes RB1-RB4, and one storage chamber SpK per brake circuit BK1, BK2.

One aspect of the invention is that the first brake module controller ECUBM1 is connected to the second brake module controller ECUBM2 of the second brake module BM2 via at least one communication connection (cf. CAN bus CAN) and, in order to achieve safety aspects, at least the inlet valves EV1 to EV4 are able to be controlled by the first brake module controller ECUBM1.

A (further) aspect of the invention consists in the wheel-specific pressure reduction using the outlet valves AV1 to AV4 and the HSV valves of the ESP unit.

FIG. 10 illustrates a basic circuit diagram of the second brake module BM2 during the pressure reduction in a first fault case. The first fault case may in this case be understood to mean that the second pressure supply unit DV2 has failed. In this case, pressure is reduced for control purposes via the first pressure supply unit DV1. For this purpose, the piston of the first pressure supply unit DV1 is retracted (to the right in the plane of the drawing, indicated by an arrow) and the normally closed outlet valves AV4 and AV3 and the normally closed isolation valve HSV2 are opened. The valves that are open in this state for the volume flow are each provided with an asterisk ("*") in FIG. 10 to clarify the open state. The state of the other solenoid valves is not explicitly given. By way of example, at least the inlet valves EV1-EV4 are closed when reducing pressure through active energization. In the exemplary embodiment, the isolation valves HSV1, HSV2 for the pressure reduction are designed as bidirectional switching valves SV1-SV4 in the form outlined.

In FIG. 10, the flow direction of the pressure medium from the wheel brakes to the first pressure supply unit DV1 is visualized by dashed arrows. According to the invention, the isolation valves HSV2 and HSV1 are operated bidirectionally, contrary to the typical use in an ESP case. The isolation valves HSV1 and HSV2 are used during normal operation—during an ESP case—to subsequently replenish fluid from the reservoir 40 by way of the pumps P. With the configuration shown, pressure may be selectively released from the wheel brakes RB1 and RB2 or RB3 and RB4 (not illustrated) when the isolation valves USV1 and USV2 are closed during normal operation by opening and closing the isolation valves HSV1 and HSV2. A wheel-specific pressure adjustment may be made by appropriately switching the outlet valves AV1 to AV4.

In the first fault case, the valves, in particular the isolation valves USV1, USV2, HSV1, HSV2 and the outlet valves AV1 to AV4, are actuated by the first brake module controller ECUBM1 and not, as is normal, by the second brake module controller ECUBM2.

The inlet valves EV1 to EV4 are closed when reducing pressure (through energization). Opening the isolation valve HSV2 creates a hydraulic connection to the first pressure supply unit DV1, bypassing the (failed) second pressure supply unit DV2.

The pressure reduction illustrated and explained in FIG. 10 by way of example for two wheel brakes RB3, RB4 may alternatively also take place in an analogous manner in a brake circuit-specific or wheel brake-specific manner. The wheel brake circuit-specific control is used for 4-channel ABS mode and, where applicable, for yaw moment interventions (also referred to as yaw moment control).

During this control, a pressure is preferably detected by way of the pressure sensor p/U (near the valve USV1 in the exemplary embodiment), such that pressure information for pressure reduction control is available at all times.

Figure 11:
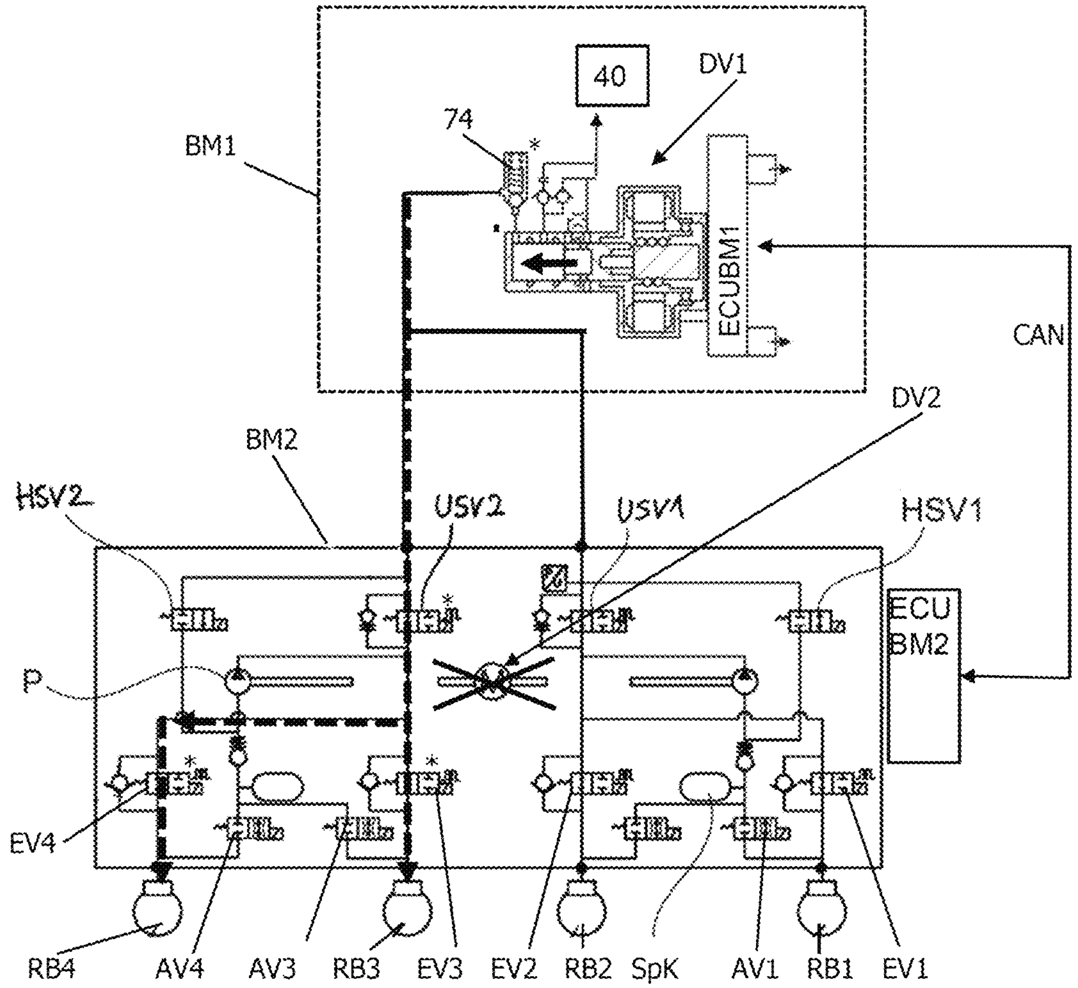

A pressure build-up in the first fault case is shown by way of example in the basic circuit diagram according to FIG. 11. In this case, the second brake module controller ECUBM2 controls the inlet valves EV1 to EV4 of the second pressure supply unit DV2, as during normal operation. The outlet valves AV1 to AV4 are (normally) closed when pressure builds up. In addition, the valve USV2 is kept (normally) open when pressure builds up, while the valves HSV1, HSV2 remain (normally) closed. FIG. 11 shows the pressure build-up in the two wheel brakes RB3, RB4 by way of example. The pressure build-up illustrated and explained with reference to FIG. 11 by way of example for two wheel brakes RB3, RB4 may alternatively also take place in an analogous manner in a brake circuit-specific or wheel brake-specific manner, as a result of which a wheel-specific pressure build-up and possibly also a yaw moment intervention may take place.

The isolation valve 74, if provided, which disconnects the first pressure supply unit DV1 from the brake circuits BK1, BK2, is operated open during pressure build-up and also during pressure reduction. The first pressure supply unit DV1 conveys pressure medium into the wheel brakes RB3, RB4 through the hydraulic line. In this exemplary embodiment too, the pressure sensor p/U, which is arranged in the second brake circuit BK2 according to FIG. 6, is used to acquire pressure information. Even when pressure builds up, the valves of the second brake module BM2 are controlled by the first brake module controller ECUBM1 via the communication connection, for example CAN bus CAN.

Figure 12:
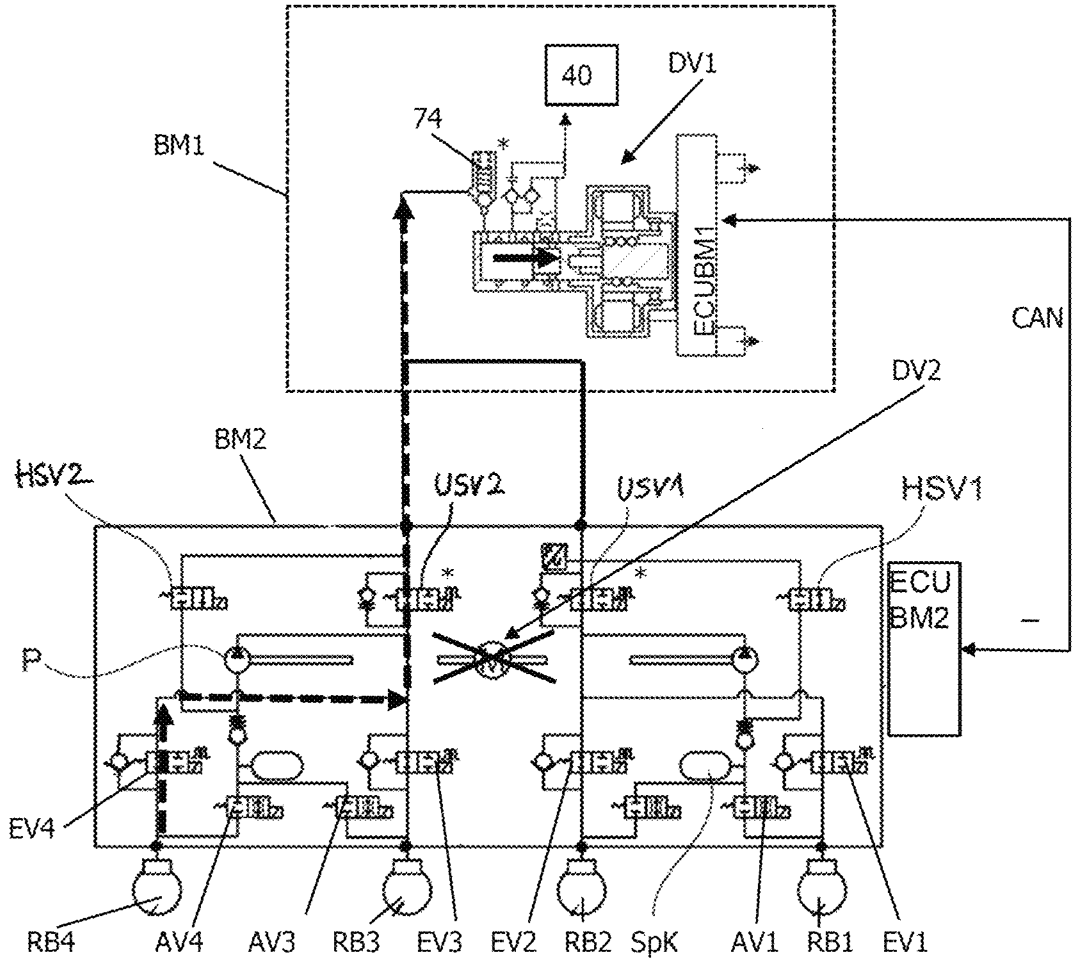
FIG. 12, 13 show a pressure reduction or build-up in the event of a failed motor in the second brake module for generating a yaw moment intervention.
Figure 13:
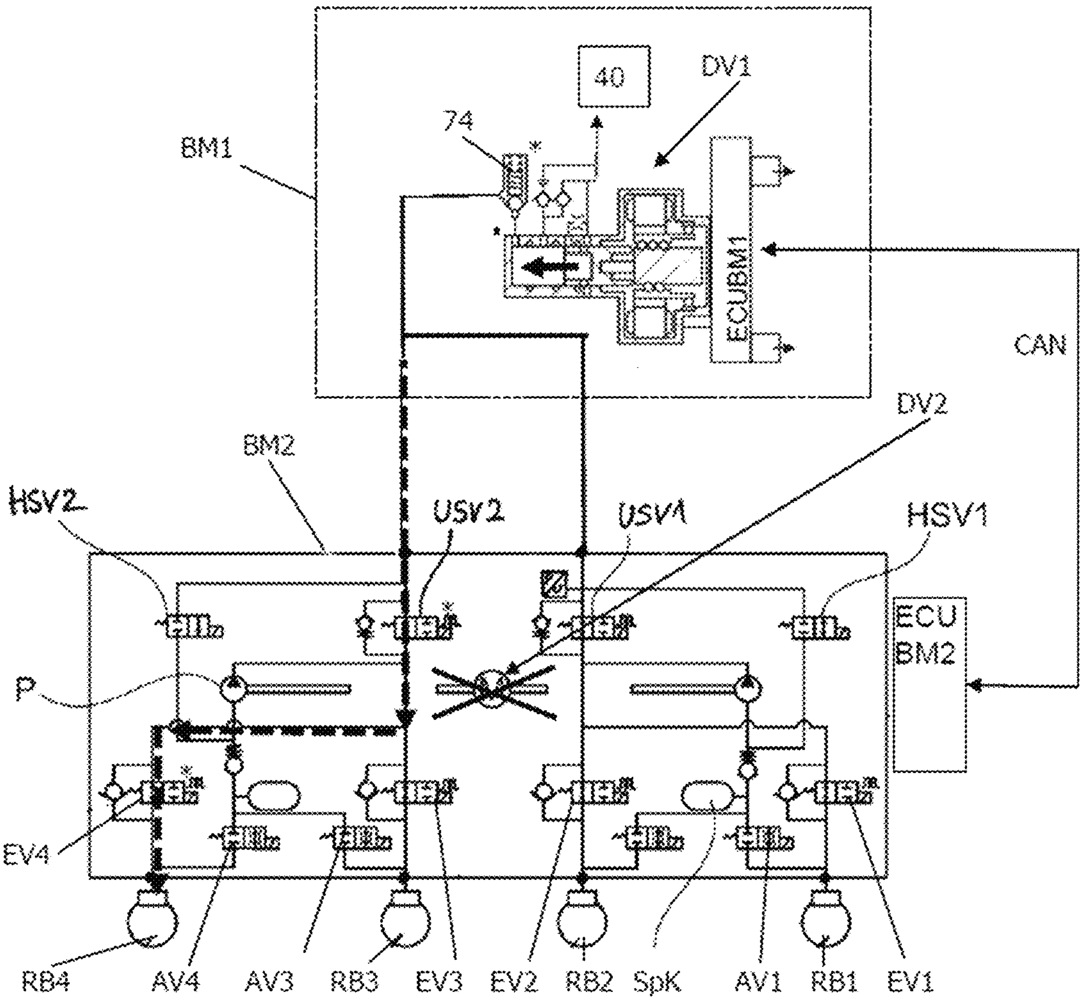

FIGS. 12 and 13 each show a basic circuit diagram of the third pressure supply unit DV3 (ESP unit) during a pressure reduction (cf. FIG. 12) or a pressure build-up (cf. FIG. 13) in the first fault case in the case of yaw moment control. Basically, the control is in this case similar to the 4-channel ABS, which is likewise possible in the first fault case. In the case of yaw moment control, however—in contrast to 4-channel ABS control—both the pressure reduction and the pressure build-up preferably take place via the inlet valves EV1-EV4 and the USV valves. In both FIG. 12 and FIG. 13, open valves relevant to flow are each provided with an asterisk ("*"). The inlet valves EV2, EV3, EV4 are closed during the pressure reduction for the yaw moment intervention through active energization. If the valves are valves that are able to be actuated by way of a PWM signal, for the purposes of this application, open may also be understood to mean that these valves are actuated under actuation with a PWM signal, such that a desired opening cross section is set. A flow rate through the respective valve may thus be controlled by actuating the valves by way of a PWM signal. Specifically, in FIGS. 12 and 13, the inlet valves EV1-EV4 and the valves USV1, USV2 may be actuated by way of a PWM signal. Thus, in the situations described below, a flow rate through these valves is able to be regulated or controlled.

FIG. 13 shows, by way of example, wheel-selective yaw moment control or a wheel-selective yaw moment intervention through pressure build-up in the wheel brake RB4. For this purpose, pressure medium flows through the inlet valve EV1 assigned to the respective wheel brake, here the wheel brake RB4, and the isolation valve USV2 assigned to the respective brake circuit, here the first brake circuit BK2. In this embodiment, the valves do not have to be actively actuated, since they are passively open in the normally open state and permit a bidirectional volumetric flow of the pressure medium. For the selective pressure generation in a wheel brake RB4, the other inlet valves EV1-EV3, via which no pressure is intended to be built up (RB1-RB3), are actuated such that the solenoid valves are changed from the open state to the closed state with energization. Actuation in the case of a normally open valve may in this sense be understood to mean that the inlet valves EV1-EV3 are switched closed, that is to say so as not to channel pressure medium. The HSV valves for the selective pressure generation in the wheel brake RB4 are likewise closed during the described yaw moment intervention, that is to say switched so as not to channel pressure medium.

Pressure is thus applied from the first pressure supply unit DV1, via the isolation valve USV2 and the inlet valve EV4, exclusively in the wheel brake RB4 (indicated schematically by an arrow).

According to the process described for wheel brake RB4, a yaw moment may be generated in multiple wheel brakes RB1, RB2, RB3, RB4. For this purpose, those inlet valves EV1-EV4 of the wheel brakes RB1, RB2, RB3, RB4 in which no pressure is intended to be built up are each closed. With this expansion, a yaw moment may be generated simultaneously in for example two wheel brakes RB1, RB2, RB3, RB4 on one side of the vehicle.

A pressure reduction, as shown for example in FIG. 12, takes place in an analogous but opposite manner, wherein pressure medium is returned from the wheel brake RB4, via the inlet valve EV4 and the isolation valve USV2, to the first pressure supply unit DV1. The pressure reduction then also takes place analogously in the case of yaw moment interventions in multiple wheel brakes. In this case too, the multiplex method is preferably used.

In addition, in one embodiment, several, in particular all four, wheel brakes RB1, RB2, RB3, RB4 may also be controlled individually and wheel-selectively in an analogous manner, and wheel-selective yaw moment control may thus be implemented.

In summary, the following states result for the relevant valves of the second brake module BM2 for the pressure reduction according to FIG. 12:

HSV1: closed (not energized)

HSV2: closed (not energized)

EV4: open (normally open)

UPS1: closed (closed with energization)

EV1-EV3: closed (energized)

All other valves in the hydraulic, in particular non-energized initial state

In the exemplary embodiments according to FIGS. 10 to 13, a first brake module BM1 of very simple design is used for illustration. According to the invention, the described second brake module BM2 may also be used in conjunction with the first brake modules BM1, as explained with reference to FIG. 7, 8. The same applies to the described method for pressure build-up and pressure reduction for a yaw moment intervention and/or braking of the vehicle.

The structure according to the invention with the primary control unit M-ECU and the described driving dynamics system FDS with brake modules BM1, BM2, the power steering system EPS and the vehicle electric motors TM1, TM2 has the advantage that the entire vehicle is able to be optimized in terms of driving dynamics and efficiency (recuperation of braking energy, friction-free brake) with very few components. Furthermore, standard components that are produced in large numbers and at low cost may be used. In addition, triple redundancy is achieved through software solutions and simple modifications (for example 2×3 phase design, external access to the solenoid valves), or may be gradually expanded from double redundancy to triple redundancy.

Automobile manufacturers may implement extensive driving dynamics functions, potentially in cooperation with the brake system and steering system manufacturers, and apply and optimize them independently. In addition, brake-by-wire and steer-by-wire may be implemented in an overall system with only very few structural units and smart redundancy.

In one stage of development, OEMs may integrate brake control, which is an essential part of the driving dynamics control with vehicle electric motors TM1, TM2, into the primary control unit M-ECU directly and independently of the module manufacturer, and remove the control level of the brake module controllers ECUBM1, ECUBM2. In this case, the brake control with recuperation and electric brake force adjustment as well as the electric power steering system EPS is only a software module or a domain in the primary control unit M-ECU The redundancy levels given in FIG. 14 may be achieved using the driving dynamics system FDS:

Primary control (normal operation):

Axle-specific brake force boosting and electronic brake force distribution (e-BKV and EBV) are controlled by the first brake module BM1. The braking torque may thus be distributed in an axle-specific manner and braking energy may also be recuperated at the same time with the vehicle electric motors TM1, TM2 on both axles VA, HA.

ABS/ESP control is performed by the brake module BM2 (ESP unit).

The steering is performed by the power steering system ESP, which is equipped with a 2×3 phase winding. The steering is preferably supported by yaw moment interventions performed by the second brake module BM2. During dynamic driving, this leads to an improvement in agility.

Standstill braking (or "hill hold") is performed for example by the first brake module BM1. The pressure supply unit DV1 is able to achieve very precise and axle-specific pressure control (PPC piston control) in the wheel brakes RB1-RB4. Further components, in particular electric motors, do not have to be provided.

Secondary control in the event of partial failure (single failure)

In the event of failure of the first brake module BM1, the E-BKV and EBV functions are taken over by the second brake module BM2 without any functional restrictions.

In the event of failure of the drive or the pump of the second brake module BM2, the ABS and ESP functions are taken over by the first brake module BM1. The function may be fully maintained by actuating the valves of the second brake module via an interface.

In the event of partial failure of the electric power steering system EPS (for example of a three-phase branch), the electric power steering system EPS is only operated with one branch and is still able to steer the vehicle with restricted dynamics. In this case, the steering is supported by wheel-specific brake pressures from the first brake module BM1. As an alternative, support may be provided by the second brake module BM2. However, support provided by the first brake module BM1 is preferable because the drive motor of the first brake module BM1 has higher dynamics and power, the pressure control is very precise and therefore yaw moment interventions are able to be introduced with high precision and dynamics.

Standstill braking (or "hill hold") is performed by the second brake module BM2 in the event of failure of the first brake module BM1.

Tertiary control in the event of complete failure of a module (double fault or multiple faults)

E-BKV and EBV functions are performed by the first brake module BM1, the motor of which is preferably implemented redundantly, in a manner comparable to the electric power steering system ESP with 2×3 branches. Due to the lower dynamics, the electric brake force distribution is then supported by the braking effect of at least one vehicle electric motor TM1, TM2.

ABS and ESP functions are maintained by the first brake module BM1 in the event of failure of the drive or the pump of the second brake module BM2 and also of a three-phase branch of the EC motor of the second brake module BM1. The wheel-specific function may be fully maintained by actuating the valves of the first brake module BM1 via an interface. Due to the low power of the drive motor in 1×3 phase mode, the ABS control is able to take place only up to half the rated pressure of the pressure supply. If access to the valves of the second brake module BM2 also fails, the vehicle is operated with an automated intermittent brake or in 1-channel or 2-channel ABS mode.

the event of complete failure of the electric power steering system EPS (for example of a three-phase branch), steering is performed in this case though wheel-specific brake pressures using the first brake module BM1. For this purpose, a yaw moment is generated on one or more wheels R1-R4.

Standstill braking (or "hill hold") is performed by the first brake module BM1 in 1×3 phase mode and at least one of the vehicle electric motors TM1, TM2 is used to support the standstill braking function.

In some of the above exemplary embodiments, multiple vehicle electric motors TM1, TM2 have been used. According to the invention, a total of just one vehicle electric motor TM1 may be used.

In some exemplary embodiments, multiple brake module controllers have been used to implement the described functions. The functions may however also be implemented with just one brake module controller.

In the described exemplary embodiments and embodiments (cf. also the wording of the claims), the first pressure supply unit or pressure supply device has been consistently used in conjunction with the reference sign "DV1" and the second pressure supply unit or pressure supply device has been consistently used in conjunction with the reference sign "DV2". However, this is not intended to limit the technical teaching explained with regard to the first and/or second pressure supply unit to the respective pressure supply unit. According to the invention, teaching explained in connection with the first pressure supply unit may also readily be applied to the second pressure supply unit. The same applies to teaching explained in connection with the second pressure supply unit, and may readily be applied to the second pressure supply unit.

By way of example, the first fault case, in particular in connection with the exemplary embodiment according to FIG. 9, may thus denote a failure of the first pressure supply device DV1, wherein the driving dynamics system is designed, in the first fault case, in order to provide a yaw moment intervention and/or steering assistance, to build up a pressure in at least one wheel brake RB1, RB2, RB3, RB4 by way of the second pressure supply device DV2. Likewise, in particular with reference to FIG. 9, in the second fault case, in particular the at least partial failure of the steering actuator (EPS), the first pressure supply device DV1 may be used to implement the steering command, in particular by building up pressure in the wheel brakes RB1-RB4.

Furthermore, in particular with reference to the exemplary embodiment according to FIG. 9, upon detection of an at least partial failure of the first pressure supply unit DV1, the driving dynamics system may be configured to provide an ABS function and/or a yaw moment intervention, wherein (wheel-specific and/or selective) adjustment of the pressures in the wheel brakes RB1, RB2, RB3, RB4 takes place by actuating at least one of the brake pressure adjustment valves AV1-AV4, EV1-EV4, SV1-SV4 and/or isolation valves BP1, BP2 and the second pressure supply unit DV2.

It should be pointed out at this juncture that all parts described above individually on their own—including without features additionally described in the respective context, even if these have not been explicitly individually identified as optional features in the respective context, for example by using: in particular, preferably, by way of example, for example, possibly, round brackets, etc.—and in combination or any sub-combination, should be considered as independent designs or developments of the invention, as defined in particular in the introductory part of the description and the claims. Deviations from this are possible. Specifically, it should be pointed out that the term in particular or round brackets do not denote any features that are mandatory in the respective context.

REFERENCE SIGNS

1 accelerator pedal
BM1 first brake module
DV1 first pressure supply unit or pressure supply device
18 electromotive drive
ECUBM1 first brake module controller (ECU-X-Boost)
DV3 third pressure supply unit or pressure supply device
21 breather bore of the third pressure supply unit
22 master brake cylinder
22*a*, 22*b* sealing element of the auxiliary piston
23 piston chamber
24 piston
26 actuator element
28 travel simulator
28*a*, 28*b* sealing element of the travel simulator
29 travel simulator valve
30*a*, 30*b* pedal travel sensor
36 spring
40 reservoir
42*a*, 42*b* sealing elements
62 sensor element
69 feed valve
70*b*, 70*c*, 80*d*, RV1, RV2, NV suction value
ÜV pressure limit valve
74 fourth isolation valve
BM2 second brake module
ECUBM2 second brake module controller
DV2 second pressure supply unit or pressure supply device
91 drive/motor M
M-ECU primary control unit
A1, A2 connection point
B1, B2 electrical connections (three-phase)
P pump
BP1, TV1 first isolation valve
TVBK2, TV2 second isolation valve
BP2 third isolation valve
RB1, RB2, RB3, RB4 wheel brake
R1, R2, R3, R4 wheel
DR throttle
BK1 first brake circuit
BK2 second brake circuit
HL1 first hydraulic line
HL2 second hydraulic line
HL3 third hydraulic line
HL4 fourth hydraulic line
L6 longitudinal axis of the first pressure supply unit
L14 longitudinal axis of the second pressure supply unit
VA front axle
HA rear axle
TM1 vehicle electric motor
TM2 vehicle electric motor
RVHZ check valve
CAN CAN bus
ST plug connector
NS float
NST level sensor
HSV1, HSV2, USV1, USV2 valves of the ESP unit
AV1, AV2, AV3, AV4 outlet valve
EV1, EV2, EV3, EV4 inlet valve
SV1, SV2, SV3, SV4 bidirectional switching valves
ZAV central outlet valve
Spk storage chamber
C steering signal (steering setpoint value)
D drive signal (drive setpoint value)
S1, S4 signals
EPS power steering system
FDS driving dynamics system
P1, P2 on-board power system
M-ECUAD AD control unit

What is claimed is:

1. A driving dynamics system for a vehicle, including:

a primary control unit configured to detect or generate steering commands and braking commands;

a brake system with a first brake module comprising a first electrohydraulic pressure supply unit, and with a second brake module comprising a second electrohydraulic pressure supply unit;

four hydraulically actuatable wheel brakes, which are assigned to respective wheels;

electrically actuatable brake pressure adjustment valves;

a steering actuator arranged to actuate at least one axle; and at least one bus connection arranged to communicatively connect a control unit of the first brake module with the primary control unit;

wherein the first brake module and the second brake module are housed in separate enclosures, wherein the driving dynamics system is configured to, in implementing a braking command in normal operation, control at least the second pressure supply unit and at least the brake pressure adjustment valves to implement a wheel-individual pressure adjustment and, in a first fault case, to control at least the first pressure supply unit and at least the brake pressure adjustment valves to implement a wheel-individual pressure adjustment, wherein the primary control unit is configured to send control commands to the brake system, wherein the control commands are executed by the first brake module and the second brake module, wherein the control commands comprise information about target pressures or target pressure profiles.

2. The driving dynamics system according to claim 1, further including a detection unit configured to detect at least the first fault case, wherein the driving dynamics system is configured to, in the first fault case, build up pressure in at least one wheel brake using the first pressure supply unit to provide a yaw moment intervention or steering assistance.

3. The driving dynamics system according to claim 2, wherein the first fault case is an at least partial failure of the second brake module or of the steering actuator.

4. The driving dynamics system according to claim 2, wherein the detection unit or a further detection unit is configured to detect at least a second fault case, wherein in the second fault case, a steering command is implemented using the second pressure supply unit.

5. The driving dynamics unit according to claim 4, wherein the steering command is implemented using the second pressure supply unit to build up a pressure in the wheel brakes on one side of the vehicle.

6. The driving dynamics system according to claim 4, wherein the first brake module with the first pressure supply unit is configured to apply a pressure medium to at least one first brake circuit via a first connection point and at least one second brake circuit via a second connection point, wherein a first isolation valve of the first brake module is arranged in a first hydraulic line between the first pressure supply unit of the first brake module and the first connection point, wherein a second isolation valve is arranged in a second hydraulic line between the first pressure supply unit and the second connection point, and wherein the brake system is configured to detect a third fault case and, in the third fault case, to control the first pressure supply unit and the first and second isolation valves to implement at least one brake circuit-individual pressure control in the at least two brake circuits.

7. The driving dynamics system according to claim 6, wherein the third fault case corresponds to a total failure of the second brake module with the second pressure supply unit.

8. The driving dynamics system according to claim 1, wherein each wheel brake is assigned a respective one of the brake pressure adjustment valves to implement pressure build-up and pressure reduction in the respective wheel brake.

9. The driving dynamics system according to claim 6, wherein the second pressure supply unit comprises a single-circuit pump, which is hydraulically connected to a reservoir to convey pressure medium into the at least one first brake circuit or the at least one second brake circuit.

10. The driving dynamics system according to claim 6, wherein the detection device or a further detection device is configured to detect a fourth fault case or a fifth fault case, wherein the driving dynamics system is configured, in response to detection of the fourth fault case or the fifth fault case, to close at least one of the isolation valves or at least one of the brake pressure adjustment valves to hydraulically decouple a failed brake circuit or a failed wheel brake.

11. The driving dynamics system according to claim 1, wherein the steering actuator comprises at least one electromotive drive with redundant windings and redundant control, so that in an event of a failure, functionality of the steering actuator is able to be maintained at least partially via the redundant windings and control, or wherein the first or second pressure supply unit comprises at least one electromotive drive with redundant windings and redundant control, so that in an event of a failure, a pressure build-up or pressure reduction in the wheel brakes is able to be implemented at least partially via the redundant windings and redundant control.

12. The driving dynamics system according to claim 1, wherein in a sixth fault case, during an at least partial failure of the first pressure supply unit or the second pressure supply unit, the pressure supply unit that is not subject to the at least partial failure builds up pressure or activates at least one vehicle electric motor to implement standstill braking.

13. The driving dynamics system according to claim 6, wherein upon detection of an at least partial failure of the second pressure supply unit, the driving dynamics system is configured to provide an anti-lock braking (ABS) function or a yaw moment intervention, wherein an adjustment of pressures in the wheel brakes is carried out by controlling at least one of the brake pressure adjustment valves or one of the isolation valves of the second brake module and the first pressure supply unit.

14. The driving dynamics system according to claim 1, wherein the driving dynamics system is configured to actuate one of the pressure supply units to implement a pressure reduction in at least one of the wheel brakes.

15. The driving dynamics system according to claim 1, further including:

at least one bus connection to communicatively connect the steering actuator with the primary control unit; or transceiver units to wirelessly communicatively connect the first brake module with the primary control unit.

16. A vehicle including the driving dynamics system according to claim 1.

17. The vehicle according to claim 16, further including:

a front axle and a rear axle, wherein wheels on the front axle or on the rear axle are enabled to be braked via the wheel brakes; and at least one vehicle electric motor arranged to drive the front axle and the rear axle, wherein the primary control unit is communicatively connected to the at least one vehicle electric motor to control the at least one vehicle electric motor to generate a braking torque.

18. A method for controlling a vehicle with the driving dynamics system according to claim 1, the method including:

issuing a control command, comprising a steering or a braking command, by the primary control unit;

receiving the control command by at least one control unit of a the first brake module or the second brake module;

monitoring the vehicle situation using a detection unit; and executing the control command by at least one actuator, if the detection unit indicates that the vehicle is in a normal situation; or executing an at least partially modified control command by the at least one control unit of the first brake module or the second brake module if the detection unit indicates that the vehicle is in a risky situation.

19. The method according to claim 18, wherein monitoring using the detection unit includes recognizing an imminent locking of at least one wheel or an imminent skidding of the vehicle during a steering attempt or an imminent spinning of at least one wheel as a risky situation.

20. A computer-readable medium, comprising instructions that, when executed, implement the method according to claim 18.

* * * * *